(12) United States Patent
Otsuka et al.

(10) Patent No.: US 9,214,690 B2
(45) Date of Patent: Dec. 15, 2015

(54) SOLID OXIDE FUEL CELL DEVICE

(75) Inventors: Toshiharu Otsuka, Nakama (JP);
Katsuhisa Tsuchiya, Chigasaki (JP);
Tsukasa Shigezumi, Nishinomiya (JP);
Toshiharu Ooe, Chigasaki (JP);
Kiyotaka Nakano, Narashino (JP);
Takuya Matsuo, Yokohama (JP)

(73) Assignee: TOTO LTD., Fukuoka (JP)

( * ) Notice: Subject to any disclaimer, the term of this patent is extended or adjusted under 35 U.S.C. 154(b) by 312 days.

(21) Appl. No.: 13/823,906

(22) PCT Filed: Sep. 28, 2011

(86) PCT No.: PCT/JP2011/072225
§ 371 (c)(1),
(2), (4) Date: Mar. 15, 2013

(87) PCT Pub. No.: WO2012/043647
PCT Pub. Date: Apr. 5, 2012

(65) Prior Publication Data
US 2013/0171534 A1    Jul. 4, 2013

(30) Foreign Application Priority Data

Sep. 30, 2010 (JP) ................................ 2010-220709
Sep. 30, 2010 (JP) ................................ 2010-220710

(51) Int. Cl.
*H01M 8/06*    (2006.01)
*H01M 8/04*    (2006.01)
(Continued)

(52) U.S. Cl.
CPC .......... *H01M 8/0606* (2013.01); *H01M 8/0432* (2013.01); *H01M 8/04052* (2013.01);
(Continued)

(58) Field of Classification Search
CPC ..................... H01M 8/04223; H01M 8/04268; H01M 8/04298–8/04373; H01M 8/04694–8/04738; H01M 8/06–8/0693
See application file for complete search history.

(56) References Cited

U.S. PATENT DOCUMENTS

2004/0048118 A1* 3/2004 Nakaji et al. ................... 429/22
2008/0102023 A1* 5/2008 Saito et al. .................. 423/648.1
(Continued)

FOREIGN PATENT DOCUMENTS

JP    2003-095611 A    4/2003
JP    2004-319420 A    11/2004
(Continued)

OTHER PUBLICATIONS

Machine Translation of Takahashi JP2008-243597 (Oct. 9, 2008).*
(Continued)

*Primary Examiner* — Jonathan Crepeau
*Assistant Examiner* — Jacob Buchanan
(74) *Attorney, Agent, or Firm* — Brinks Gilson & Lione

(57) ABSTRACT

A solid oxide fuel cell device is provided which prevents excessive rising of the temperature inside a fuel cell module during the startup process. In a startup process, control unit controls to cause a transition from a fuel gas reforming reaction process to a POX process, an ATR process, and a SR process, then to a generating process; when the cell stack temperature and reformer temperature in each process satisfy respectively set transition conditions, a transition to the next process takes place; if control unit determines a temperature rise assist state exists, it executes an excess temperature rise suppression control so that during at least the transition to the generating process, the reformer temperature does not exceed a predetermined value.

15 Claims, 22 Drawing Sheets

(51) Int. Cl.
*C01B 3/02* (2006.01)
*H01M 8/24* (2006.01)
*H01M 8/12* (2006.01)

(52) U.S. Cl.
CPC ...... *H01M 8/04089* (2013.01); *H01M 8/04268* (2013.01); *H01M 8/04373* (2013.01); *H01M 8/04701* (2013.01); *H01M 8/04738* (2013.01); *H01M 8/04753* (2013.01); *H01M 8/04761* (2013.01); *H01M 8/04776* (2013.01); *H01M 8/0618* (2013.01); *H01M 8/0662* (2013.01); *H01M 8/0668* (2013.01); *H01M 8/243* (2013.01); *H01M 8/2475* (2013.01); *C01B 3/02* (2013.01); *H01M 8/04022* (2013.01); *H01M 2008/1293* (2013.01); *Y02E 60/50* (2013.01); *Y02E 60/525* (2013.01)

(56) References Cited

U.S. PATENT DOCUMENTS

| | | | | |
|---|---|---|---|---|
| 2009/0291335 | A1* | 11/2009 | Anzai | 429/17 |
| 2011/0053017 | A1* | 3/2011 | Takahashi | |
| 2011/0076578 | A1 | 3/2011 | Shigezumi et al. | |
| 2012/0021319 | A1 | 1/2012 | Tsuchiya et al. | |
| 2012/0028143 | A1 | 2/2012 | Akagi et al. | |

FOREIGN PATENT DOCUMENTS

| | | | | |
|---|---|---|---|---|
| JP | 2004-338975 | A | | 12/2004 |
| JP | 2005-317405 | A | | 11/2005 |
| JP | 2008-243597 | A | | 10/2008 |
| JP | 2009032555 | A | * 2/2009 | ............. H01M 8/04 |
| JP | WO 2009028427 | A1 | * 3/2009 | ............. C01B 3/382 |
| JP | 4474688 | B1 | | 6/2010 |
| JP | 2010-238623 | A | | 10/2010 |
| JP | 2011-096635 | A | | 5/2011 |
| WO | WO 2009028427 | A1 | * 3/2009 | ............. H01M 8/06 |

OTHER PUBLICATIONS

Machine Translation of Hirao et al., JP 2003-095611 (Apr. 3, 2003).*
Machine Translation of Ono, JP 2009-032555 (Feb. 2009).*
International Search Report for International Application No. PCT/JP2011/072225, dated Jan. 10, 2012, 2 pages.
Written Opinion of the International Searching Authority for International Application No. PCT/JP2011/072225, dated Jan. 10, 2012, 4 pages.

* cited by examiner

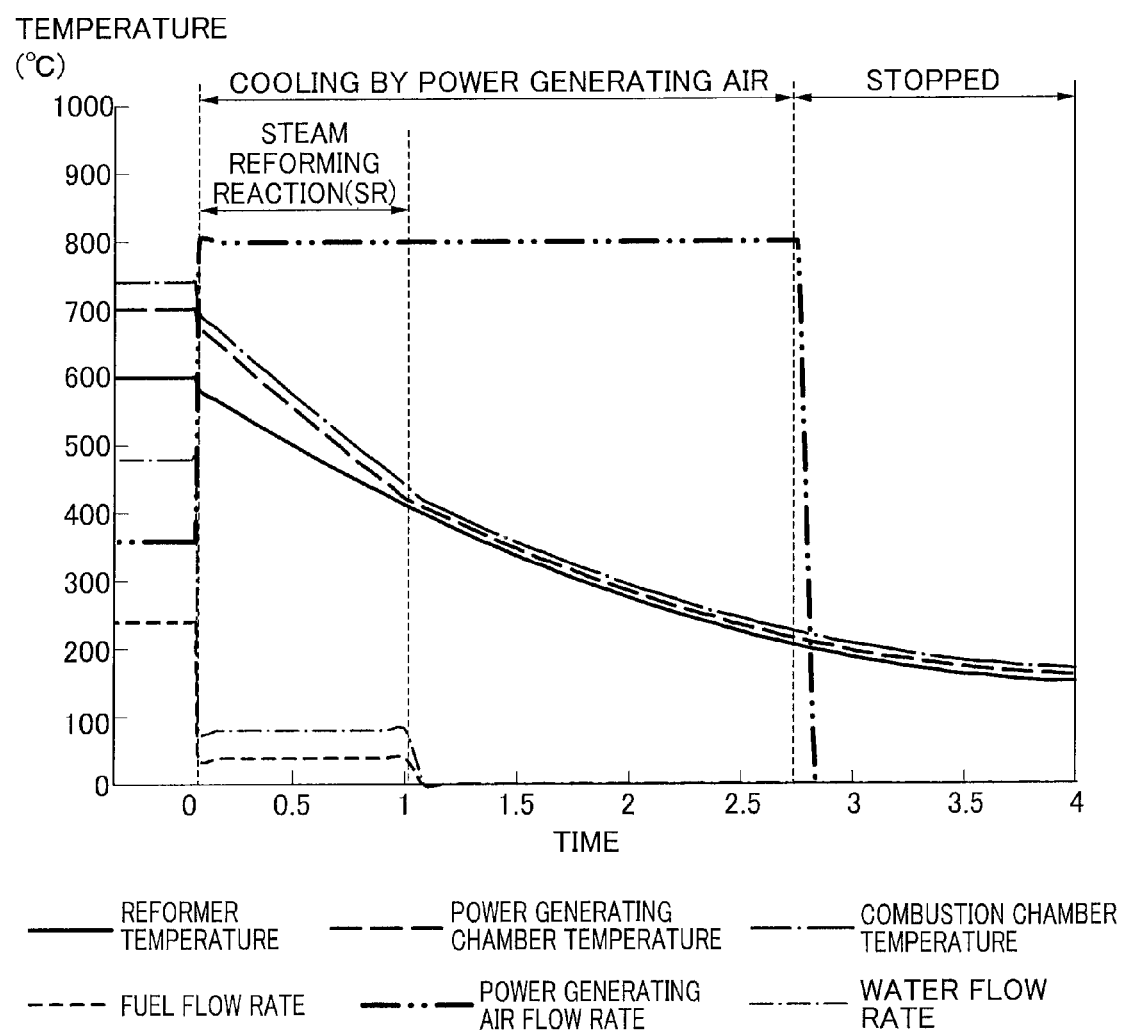

FIG.9

| MODE | PROCESS | FUEL SUPPLY FLOW RATE (L/min) | REFORMING AIR SUPPLY FLOW RATE (L/min) | POWER GENERATING AIR SUPPLY FLOW RATE (L/min) | WATER SUPPLY FLOW RATE (cc/min) | TEMPERATURE CONDITIONS FOR TRANSITION (°C) | |
|---|---|---|---|---|---|---|---|
| | | | | | | REFORMER TEMPERATURE | CELL STACK TEMPERATURE |
| STARTUP MODE | COMBUSTION OPERATION | 6.0 | 10.0 | 100.0 | 0.0 | 300°C OR ABOVE | — |
| | POX1 | 6.0 | 10.0 | 100.0 | 0.0 | 350°C OR ABOVE | — |
| | POX2 | 5.0 | 18.0 | 100.0 | 0.0 | 600°C OR ABOVE | 250°C OR ABOVE |
| | ATR1 | 5.0 | 8.0 | 100.0 | 2.0 | 600°C OR ABOVE | 400°C OR ABOVE |
| | ATR2 | 4.0 | 4.0 | 100.0 | 3.0 | 650°C OR ABOVE | 600°C OR ABOVE |
| | SR1 | 3.0 | 0.0 | 100.0 | 8.0 | 650°C OR ABOVE | 650°C OR ABOVE |
| | SR2 | 2.3 | 0.0 | 80.0 | 6.3 | 650°C OR ABOVE | 700°C OR ABOVE |

FIG.11

| MODE | PROCESS | FUEL SUPPLY FLOW RATE (L/min) | REFORMING AIR SUPPLY FLOW RATE (L/min) | POWER GENERATING AIR SUPPLY FLOW RATE (L/min) | WATER SUPPLY FLOW RATE (cc/min) | TEMPERATURE CONDITIONS FOR TRANSITION (°C) REFORMER TEMPERATURE | TEMPERATURE CONDITIONS FOR TRANSITION (°C) CELL STACK TEMPERATURE |
|---|---|---|---|---|---|---|---|
| | COMBUSTION OPERATION | 6.0 | 10.0 | 100.0 | 0.0 | 300°C OR ABOVE | – |
| STARTUP MODE | POX1 | 6.0 | 10.0 | 100.0 | 0.0 | 350°C OR ABOVE | – |
| | POX2 | 5.0 | 18.0 | 100.0 | 0.0 | 600°C OR ABOVE | 250°C OR ABOVE |
| | ATR1 | 5.0 | 8.0 | 100.0 | 2.0 | 600°C OR ABOVE | 400°C OR ABOVE |
| | ATR2 | 4.0 | 4.0 | 100.0 | 3.0 | 650°C OR ABOVE | 600°C OR ABOVE |
| | SR1 | 3.0 | 0.0 | 100.0 | 8.0 | 650°C OR ABOVE | 650°C OR ABOVE OR 700°C OR ABOVE FOR REFORMER TEMPERATURE |
| | SR2 | 2.3 | 0.0 | 80.0 | 6.3 | 650°C OR ABOVE | 700°C OR ABOVE |

※Transition condition from SR1 process to SR2 process is relaxed

FIG.13

| MODE | PROCESS | FUEL SUPPLY FLOW RATE (L/min) | REFORMING AIR SUPPLY FLOW RATE (L/min) | POWER GENERATING AIR SUPPLY FLOW RATE (L/min) | WATER SUPPLY FLOW RATE (cc/min) | TEMPERATURE CONDITIONS FOR TRANSITION (°C) | |
|---|---|---|---|---|---|---|---|
| | | | | | | REFORMER TEMPERATURE | CELL STACK TEMPERATURE |
| | COMBUSTION OPERATION | 6.0 | 10.0 | 100.0 | 0.0 | 300°C OR ABOVE | — |
| STARTUP MODE | POX1 | 6.0 | 10.0 | 100.0 | 0.0 | 350°C OR ABOVE | — |
| | POX2 | 5.0 | 18.0 | 100.0 | 0.0 | 600°C OR ABOVE | 250°C OR ABOVE |
| | ATR1 | 5.0 | 8.0 | 100.0 | 2.0 | 600°C OR ABOVE | 400°C OR ABOVE |
| | ATR2 | 4.0 | 4.0 | 100.0 | 3.0 | 650°C OR ABOVE | 600°C OR ABOVE |
| | SR1 | 3.0 | 0.0 | 100.0 | 8.0 | 650°C OR ABOVE | 620°C OR ABOVE |
| | SR1.5 | 2.6 | 0.0 | 100.0 | 8.0 | 650°C OR ABOVE | 660°C OR ABOVE |
| | SR2 | 2.3 | 0.0 | 80.0 | 6.3 | 650°C OR ABOVE | 700°C OR ABOVE |

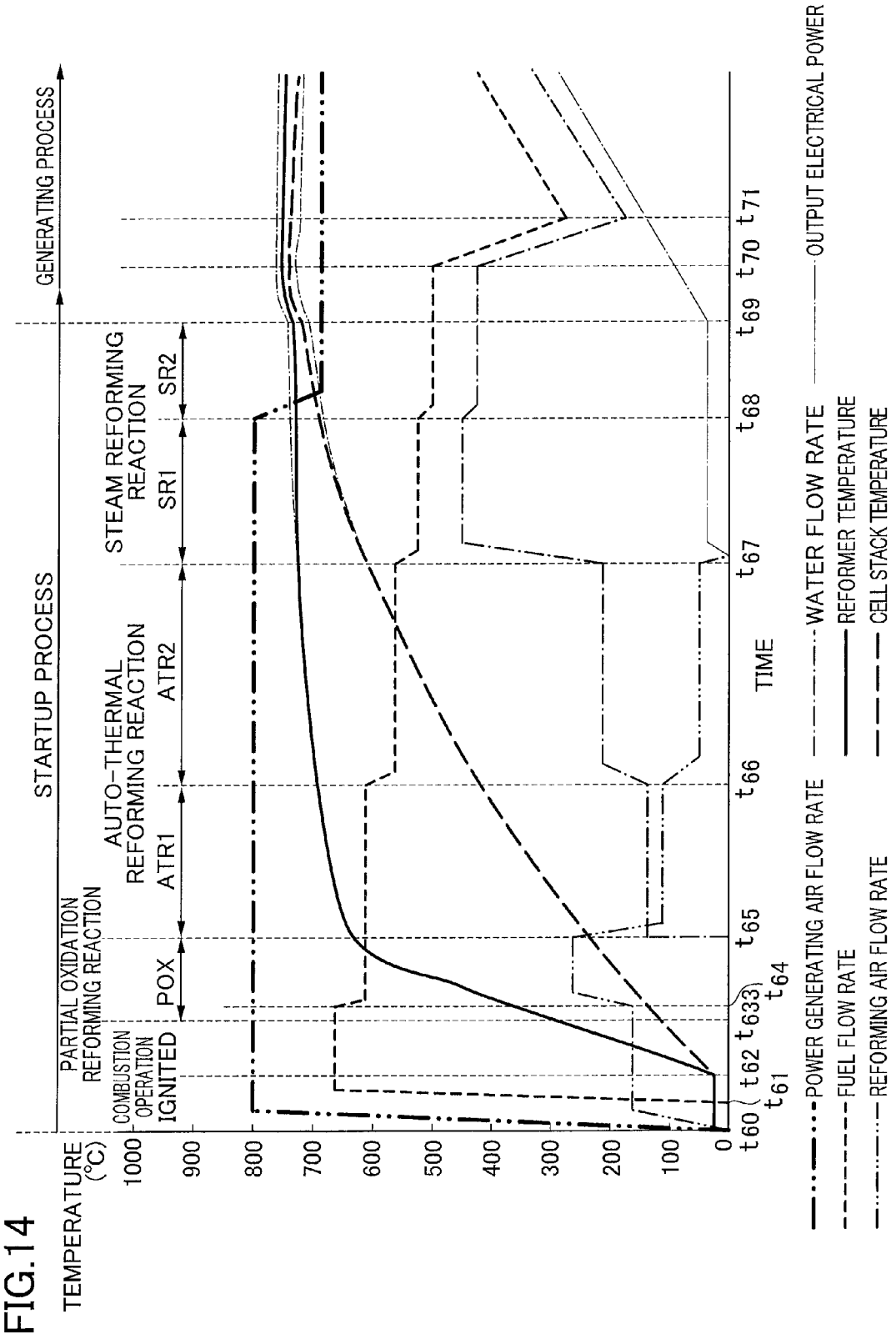

FIG.15

| MODE | PROCESS | FUEL SUPPLY FLOW RATE (L/min) | REFORMING AIR SUPPLY FLOW RATE (L/min) | POWER GENERATING AIR SUPPLY FLOW RATE (L/min) | WATER SUPPLY FLOW RATE (cc/min) | TEMPERATURE CONDITIONS FOR TRANSITION(°C) | |
|---|---|---|---|---|---|---|---|
| | | | | | | REFORMER TEMPERATURE | CELL STACK TEMPERATURE |
| STARTUP MODE | COMBUSTION OPERATION | | | | | | |
| | POX1 | 6.0 | 10.0 | 100.0 | 0.0 | 300°C OR ABOVE | — |
| | POX2 | 6.0 | 10.0 | 100.0 | 0.0 | 350°C OR ABOVE | — |
| | ATR1 | 5.0 | 18.0 | 100.0 | 0.0 | 600°C OR ABOVE | 250°C OR ABOVE |
| | ATR2 | 5.0 | 8.0 | 100.0 | 2.0 | 600°C OR ABOVE | 400°C OR ABOVE |
| | SR1 | 4.0 | 4.0 | 100.0 | 3.0 | 650°C OR ABOVE | 600°C OR ABOVE |
| | SR2 | 3.0 | 0.0 | 100.0 | 8.0 | 650°C OR ABOVE | 650°C OR ABOVE OR 700°C OR ABOVE FOR REFORMER TEMPERATURE |
| | | 2.3 | 0.0 | 80.0 | 6.3 | 650°C OR ABOVE | 700°C OR ABOVE OR 720°C OR ABOVE FOR REFORMER TEMPERATURE |

※Transition conditions from SR1 process to SR2 process and SR2 process to generating process are relaxed.

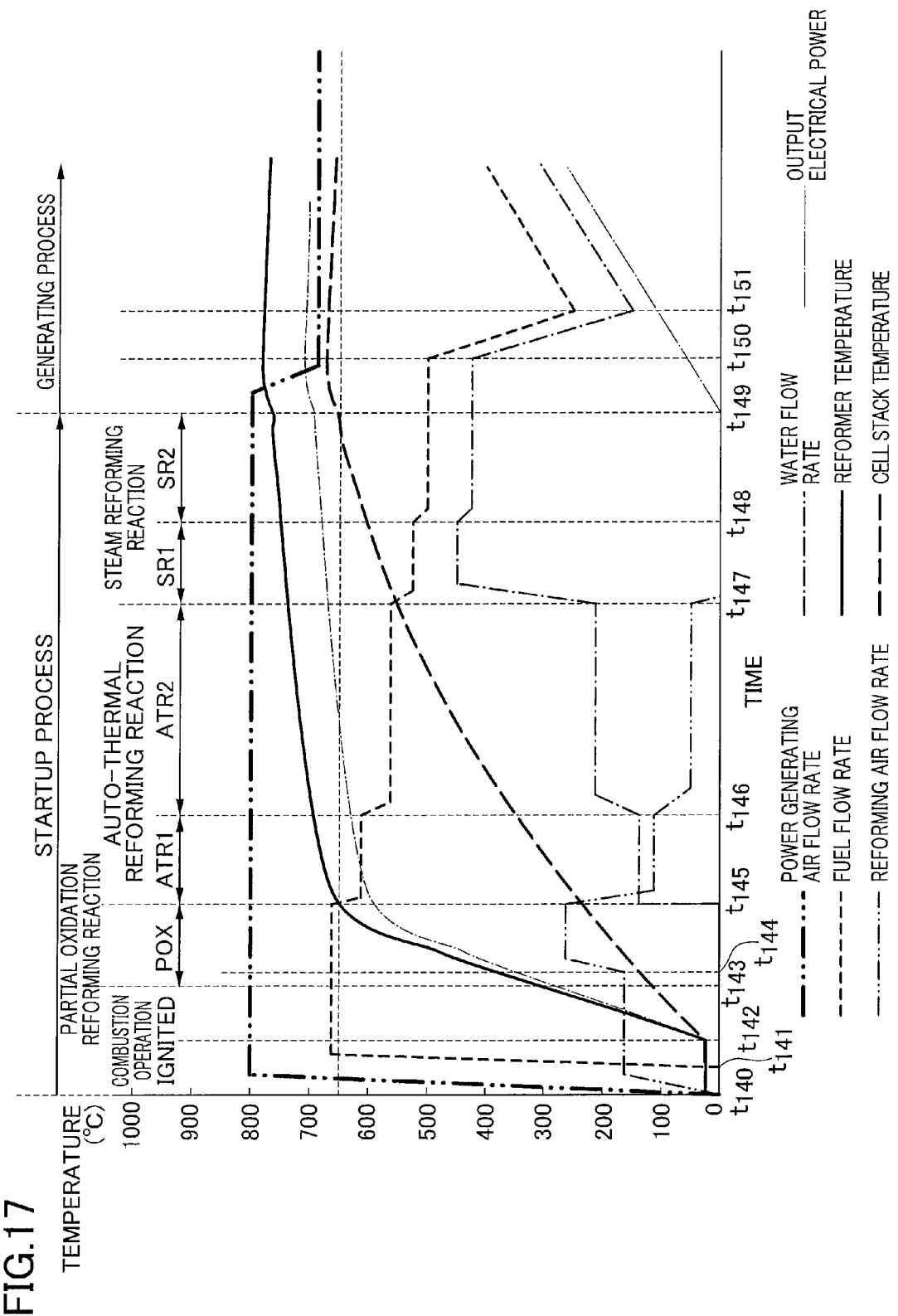

FIG.18

| MODE | PROCESS | FUEL SUPPLY FLOW RATE (L/min) | REFORMING AIR SUPPLY FLOW RATE (L/min) | POWER GENERATING AIR SUPPLY FLOW RATE (L/min) | WATER SUPPLY FLOW RATE (cc/min) | TEMPERATURE CONDITIONS FOR TRANSITION (°C) | |
|---|---|---|---|---|---|---|---|
| | | | | | | REFORMER TEMPERATURE | CELL STACK TEMPERATURE |
| | COMBUSTION OPERATION | 6.0 | 10.0 | 100.0 | 0.0 | 300°C OR ABOVE | — |
| STARTUP MODE | POX1 | 6.0 | 10.0 | 100.0 | 0.0 | 350°C OR ABOVE | — |
| | POX2 | 5.0 | 18.0 | 100.0 | 0.0 | 600°C OR ABOVE | 250°C OR ABOVE |
| | ATR1 | 5.0 | 8.0 | 100.0 | 2.0 | 600°C OR ABOVE | 350°C OR ABOVE |
| | ATR2 | 4.0 | 4.0 | 100.0 | 3.0 | 650°C OR ABOVE | 550°C OR ABOVE |
| | SR1 | 3.0 | 0.0 | 100.0 | 8.0 | 650°C OR ABOVE | 600°C OR ABOVE |
| | SR2 | 2.3 | 0.0 | 80.0 | 6.3 | 650°C OR ABOVE | 650°C OR ABOVE |

※If reformer temperature is 650°C or above at the end of POX2 process, transition condition temperatures for cell stack are changed.

FIG.19

| MODE | PROCESS | FUEL SUPPLY FLOW RATE (L/min) | REFORMING AIR SUPPLY FLOW RATE (L/min) | POWER GENERATING AIR SUPPLY FLOW RATE (L/min) | WATER SUPPLY FLOW RATE (cc/min) | TEMPERATURE CONDITIONS FOR TRANSITION (°C) | |
|---|---|---|---|---|---|---|---|
| | | | | | | REFORMER TEMPERATURE | CELL STACK TEMPERATURE |
| | COMBUSTION OPERATION | 6.0 | 10.0 | 100.0 | 0.0 | 300°C OR ABOVE | – |
| STARTUP MODE | POX1 | 6.0 | 10.0 | 100.0 | 0.0 | 350°C OR ABOVE | – |
| | POX2 | 5.0 | 18.0 | 100.0 | 0.0 | 600°C OR ABOVE | 250°C OR ABOVE |
| | ATR1 | 5.0 | 8.0 | 100.0 | 2.0 | 600°C OR ABOVE | 400°C OR ABOVE |
| | ATR2 | 4.0 | 4.0 | 100.0 | 3.0 | 650°C OR ABOVE | 600°C OR ABOVE |
| | SR1 | 3.0 | 0.0 | 100.0 | 8.0 | 650°C OR ABOVE | 600°C OR ABOVE |
| | SR2 | 2.3 | 0.0 | 80.0 | 6.3 | 650°C OR ABOVE | 650°C OR ABOVE |

※If reformer temperature is 700° C or above at the end of ATR2 process, transition condition temperatures for cell stack are changed.

FIG.20

| No. | TRANSITION CONDITION ||||||| PROCESSING ||
| | GENERATING CHAMBER TEMPERATURE Tfc | GENERATED VOLTAGE Vdc | GRID POWER Wl | INTERCONNECT POWER Winv | EXTRACTABLE CURRENT VALUE Iinv | FUEL SUPPLY CURRENT VALUE If | | PROCESSING | EXTRACTABLE CURRENT VALUE |
|---|---|---|---|---|---|---|---|---|---|
| 1 | — | — | — | — | (Iinv−ACTUAL EXTRACTED CURRENT) ≧ [400mA] AND Iinv > [1A] | — | | Iinv REDUCE | Iinv = Iinv−5mA BUT, IF <1A, Iinv=1A |
| 2 | GENERATING CHAMBER TEMPERATURE > [850°C] | — | — | — | Iinv > [1A] | — | | Iinv REDUCE | Iinv = Iinv−5mA BUT, IF <1A, Iinv=1A |
| 3 | GENERATING CHAMBER TEMPERATURE < [550°C] | — | — | — | Iinv > [1A] | — | | Iinv REDUCE | Iinv = Iinv−5mA BUT, IF <1A, Iinv=1A |
| 4 | — | GENERATED VOLTAGE < [95V] | — | — | Iinv > [1A] | — | | Iinv REDUCE | Iinv = Iinv−10mA BUT, IF <1A, Iinv=1A |
| 5 | — | — | — | INTERCONNECT POWER > [710W] | Iinv > [1A] | — | | Iinv REDUCE | Iinv = Iinv−5mA BUT, IF <1A, Iinv=1A |
| 6 | — | — | GRID POWER < [50W] | — | (Iinv−ACTUAL EXTRACTED CURRENT) > [1000mA] | — | | Iinv RAPID REDUCE | Iinv = [ACTUAL EXTRACTED CURRENT] |
| 7 | — | — | — | — | — | FUEL SUPPLY CURRENT VALUE − ACTUAL EXTRACTED CURRENT ≧ [1000mA] | | Iinv INCREASE (RAPID INCREASE) | Iinv = Iinv+100mA |
| 8 | GENERATING CHAMBER TEMPERATURE ≧ [600°C] | GENERATED VOLTAGE ≧ [100V] | GRID POWER > [40W] | INTERCONNECT POWER ≦ [690W] | (Iinv−ACTUAL EXTRACTED CURRENT) ≦ [300mA] | — | | Iinv INCREASE (NORMAL INCREASE) | Iinv = Iinv+10mA |
| 9 | OTHER THAN THOSE ABOVE ||||||| Iinv MAINTAIN | Iinv = Iinv |

※ Control cycle: 500msec

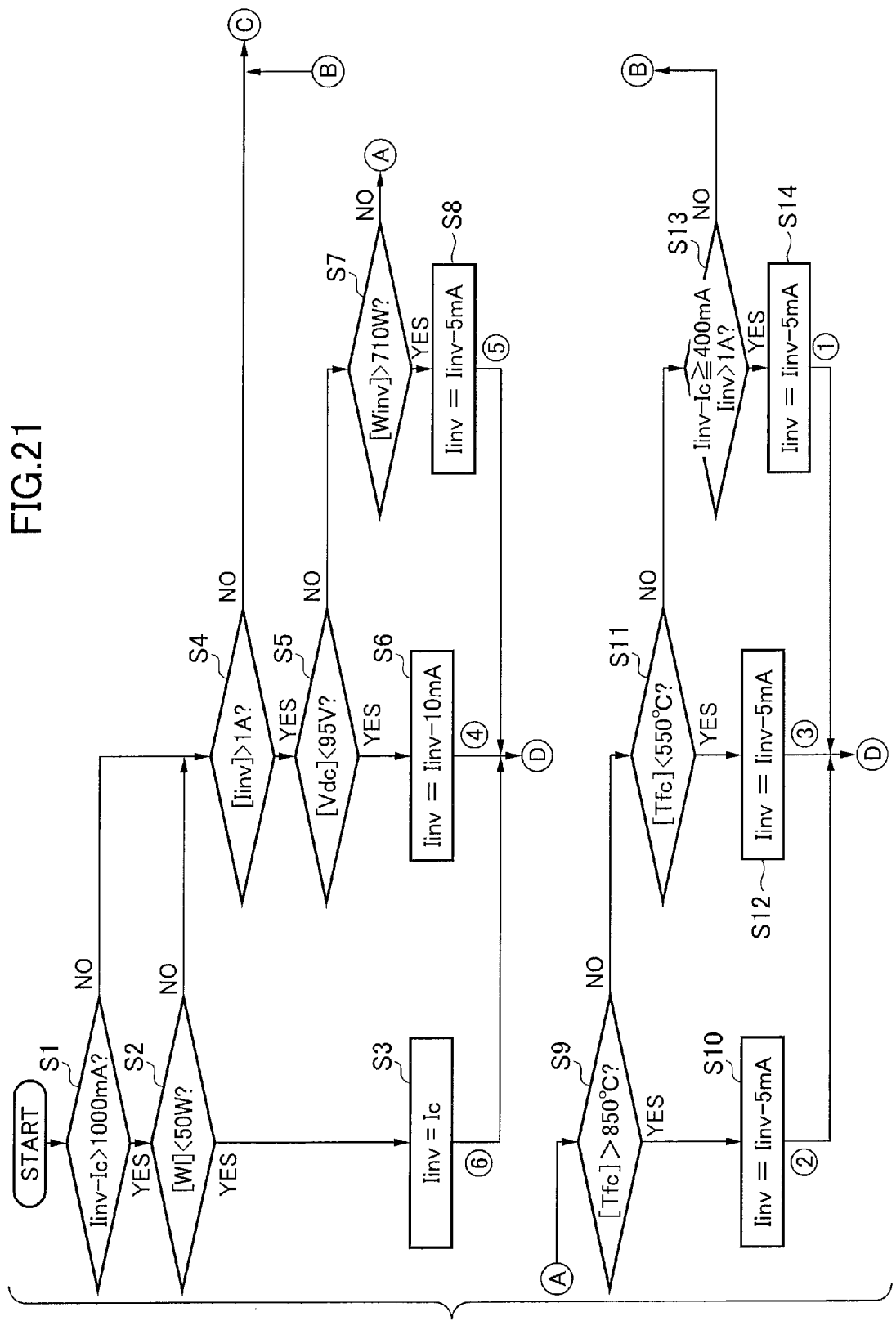

SOLID OXIDE FUEL CELL DEVICE

This application is a 371 application of PCT/JP2011/072225 having an international filing date of Sep. 28, 2011, which claims priority to JP2010-220710 filed Sep. 30, 2010 and JP2010-220709 filed Sep. 30, 2010, the entire contents of which are incorporated herein by reference.

TECHNICAL FIELD

The present invention relates to a solid oxide fuel cell device, and more particularly to a solid oxide fuel cell device for preventing excess temperature rises in a reformer or the like during startup.

BACKGROUND ART

Conventionally, solid oxide fuel cell (SOFC) devices were constituted so that during the startup process multiple processes for reforming fuel gas in a reformer, i.e. the partial oxidation reforming reaction process (POX process), auto thermal reforming reaction process (ATR process), and steam reforming reaction process (SR process) were passed through before transitioning to a generating process (see, for example, Patent Citation 1).

In an SOFC, the reformer, fuel cell stack, and the like disposed within a fuel cell module housing chamber can be caused to rise to an operating temperature by executing these processes in sequence.

The operating temperature in an SOFC is a high 600 to 800° C., and heat storage material is disposed around the fuel cell module housing chamber. Therefore this heat storage material can hold a large amount of heat during operation, raising thermal efficiency during operation.

Patent Citation 1: Published Unexamined Application 2004-319420

SUMMARY OF THE INVENTION

Problems the Invention Seeks to Resolve

However, after the operating SOFC transitions to a stop operation, the problem occurs when re-starting that due to the large amount of heat stored in the heat storage material as describe above, the temperature of the reformer or the cell stack rises excessively if startup is carried out by a normal startup process.

In a normal startup operation, for example, within the rated reforming reaction process in the reformer, the heat produced in the POX process, which is an exothermic reaction, causes the temperature of the reformer itself to rise, but also causes a temperature rise in the heat storage material and the like, which is a constituent member outside the reformer.

By contrast, in the restart operation constituent members outside the reformer have already to some extent risen in temperature, and because the heat storage material holds a large amount of heat, the heat produced in the POX process is primarily used to raise the temperature of the reformer. As a result, during the restart operation the reformer temperature rises faster than during normal startup, leading to the risk of causing an excess temperature rise, which is a state in which a predetermined operating temperature is exceeded. There is hence a risk of degradation or damage to the reformer caused by this excess temperature rise.

The present invention was undertaken to resolve this type of issue, and has the object of providing a solid oxide fuel cell device for preventing excess temperature rises inside a fuel cell module during the startup process.

Means for Solving the Problems

In order to achieve the aforementioned objects, the present invention comprises, in a solid oxide fuel cell device, a cell stack including multiple fuel cell units in combination; a reformer for reforming fuel gas supplied to the fuel cell units; a combustion portion for heating the reformer and the cell stack using exhaust gas produced by combusting surplus fuel gas or the reformed fuel gas passed through the fuel cell units; a temperature detector for detecting the temperature of the cell stack and the temperature of the reformer; a module housing chamber for housing the cell stack and the reformer; a heat storage means disposed around the module housing chamber; a determining means for determining whether a temperature rise assist state occurs in which a temperature rise in the reformer and/or cell stack is assisted by the heat amount stored by the heat storage means during startup of the fuel cell device; and a control means for starting up the fuel cell device; wherein the control means is constituted so that in the fuel cell device startup process, supply amounts of fuel gas, oxidant gas, and steam supplied to the reformer are controlled based on the cell stack temperature and the reformer temperature, and after a POX process, an ATR process, and an SR process are performed in sequence by the reformer in a fuel gas reformer reaction process, a transition is made to a generating process, and when the cell stack temperature and the reformer temperature satisfy transition conditions set to each of the POX, the ATR and the SR processes, a transition is made to the next process; and wherein when the determining means determines an occurrence of the temperature rise assist state, the control means performs an excess temperature rise suppression control to prevent the reformer temperature from rising to or above a predetermined value, at least at the time of transition to the generating process.

When starting the solid oxide fuel cell device under circumstances where a predetermined amount or greater of residual heat is present in the heat storage means, it is difficult for heat produced by the partial oxidation reforming reaction inside the reformer to be carried off by the heat storage means. The speed of the reformer temperature rise during startup therefore increases. When the rising speed of the reformer temperature is large in this manner, there is a risk that if the startup action is executed by the same method and conditions as a normal startup, the reformer temperature will rise excessively, such that the reformer temperature rises, for example to the anomaly determination temperature or above, leading to reformer degradation and damage, and to fuel cell degradation.

In the present invention the determining means determines whether if there is a temperature rise assist state, in which excess temperature rises can easily occur, and based on this determination the control means executes an excess temperature rise suppression control so that the reformer temperature does not go above a predetermined value (e.g., the anomaly determination temperature at which there is a risk of reformer degradation) during a predetermined period (i.e., the time or period of time in which the temperature is highest) in the startup process, and in particular at the time of transition to the generating process or after the generating process transition. Thus in the present invention the temperature of the reformer at startup can be prevented from excessively rising to a predetermined value or above (excess temperature rise).

Note that the excess temperature rise suppression control of the present invention includes a control to relax the transition condition in each reforming process in the startup process and transition early to the next process, a control to promote a rise in cell stack temperature while suppressing a rise in reformer temperature and reduce the temperature difference between the two, a control to reduce the amount of fuel gas supplied in the startup process, and a control to suppress excess temperature rises before and after transition to the generating process, like the control to suppress rising of the reformer temperature by output power control after transition to the generating process.

In the present invention the control means preferably starts the excess temperature rise suppression control before transition to the generating process in the startup process when the determining means determines the presence of a temperature rise assist state.

After the start of electrical generation there is a tendency for the cell stack temperature to rise to an even higher temperature due to the generating reaction, etc. In the present invention, because the excess temperature rise suppression control is started before transition to the generating process, the effects of localized or overall temperature rises caused by residual heat are eliminated at the time of generation startup, therefore the cell stack temperature and the reformer temperature which rises with the rise in cell stack temperature can be prevented from going higher than respectively corresponding predetermined temperatures.

In the present invention the SR process preferably has an SR1 process and an SR2 process, in which the fuel gas supply amount is reduced more than in the SR1 process; if the SR2 transition condition is satisfied, this being the condition for transitioning from the SR1 process to the SR2 process, for each of which reformer and cell stack temperatures are set, and if the determining means determines the presence of a temperature rise assist state, the control means transitions to the SR2 process even if the SR2 transition conditions are not yet met.

In the SR2 process the fuel gas supply amount is reduced more than in the SR1 process, therefore heating of the reformer by the combustion portion is suppressed, and reformer temperature increases are more suppressed in the SR2 process than in the SR1 process. In the present invention a temperature rise due to the residual heat amount is anticipated in the temperature rise assist state, even in a partial low temperature state before transition conditions are satisfied, therefore excess temperature rises caused by residual heat amounts can be prevented by transitioning early to the SR2 process in which temperature rises are suppressed more. Insufficiencies in the temperature rise of the cell stack or the like are compensated by the residual heat amount, therefore the problem of insufficient temperature rise in the next process and beyond do not arise.

If, in the SR1 process of the present invention, the reformer temperature satisfies the SR2 transition condition and is equal to or greater than a predetermined forced transition temperature, the control means preferably causes a transition to the SR2 process even if the cell stack temperature does not satisfy the SR2 transition condition.

Heat is produced in the POX process and ATR process by the exothermic partial oxidizing reformer reaction, but due to the existence of a residual heat amount, it is difficult for the heat storage means to remove this produced heat. The reformer temperature rise speed is therefore prone to exceed the cell stack temperature rise speed in the startup process.

Hence if the system waits until the cell stack temperature reaches the transition condition temperature, the reformer temperature rises excessively.

If, in the SR1 process of the present invention, the reformer temperature is in a high temperature state at or above a predetermined forced transition temperature, excess temperature rises in the reformer can be avoided by an early transition to the SR2 process, without waiting for the cell stack temperature to reach the transition condition temperature.

In the present invention the SR process preferably has an SR1 process and an SR2 process in which the fuel gas supply amount is reduced more than in the SR1 process; if the SR2 transition condition is satisfied, this being the condition for transitioning from the SR1 process to the SR2 process, for each of which reformer and cell stack temperatures are set, the control means switches from the SR1 process to the SR2 process, and if the determining means determines the presence of a temperature rise assist state, the control means transitions to the SR1.5 process, in which fuel gas supply amounts are less than in the SR1 process and more than the SR2 process, before switching from the SR1 process to the SR2 process.

In the present invention thus constituted, excess temperature rises in the reformer can be prevented while preventing sudden changes in temperature distribution by reducing fuel gas supply amounts in multiple stages.

In the present invention, the transition condition for switching from the SR1 process to the SR1.5 process is preferably a lower temperature condition than the SR2 transition condition.

In the present invention thus constituted, excess temperature rises in the reformer can be prevented while preventing sudden changes in temperature distribution by reducing fuel gas supply amounts in multiple stages; in addition, because the transition condition to the SR1.5 process is a lower temperature condition than the SR2 transition condition, an early transition from the SR1 process to the SR1.5 process is possible, and excessive reformer temperature rises can be prevented.

In the present invention when the determining means determines the presence of a temperature rise assist state, the control means preferably executes a temperature difference reduction control as a temperature rise suppression control for reducing the temperature difference between the reformer temperature and the cell stack temperature.

The reformer temperature is easily raised by the effects of the residual heat amount, but in the present invention, by executing an excess temperature rise suppression control for reducing the temperature difference between the reformer temperature and the cell stack temperature, a rise in only one of these temperatures in the startup process and the generating process is prevented, and excess temperature rises can be prevented.

In the present invention, if the determining means determines a temperature rise assist state, as a temperature difference reduction control, the control means extracts electrical power below rated power during the SR process before transitioning to the generating process.

In the SR process, power can be extracted if the power is less than rated. When electrical power is extracted, reformed fuel gas is consumed by electrical generation, therefore the amount of exhaust gas produced in the combustion portion is reduced, and a temperature rise in the reformer can be suppressed. Also, extraction of power promotes heating of the cell stack due to the generating reaction. In the present invention the temperature difference between the reformer and the cell stack can thus be reduced by promoting a rise in the cell stack temperature while suppressing a temperature rise in the reformer.

In the present invention the control means preferably holds fixed the amount of power extracted before transition to the generating process.

After starting power extraction, the exothermic/endothermic balance in the reformer and cell stack changes, and the temperature changes transiently. At this point, when the amount of extracted power fluctuates, fluctuating factors are further added to transient changes, making it conceivable that localized temperature differences may not alleviated. Therefore in the present invention power extraction can be held fixed to reliably shrink the temperature difference.

In the present invention the control means preferably supplies power extracted before transition to the generating process to auxiliary devices of the solid oxide fuel cell device.

In the present invention thus constituted, power extracted in the startup process can be effectively used by auxiliary devices rather than being wastefully consumed by heating elements or the like.

In the present invention the determining means, at the time of transition from at least one process to the next process, preferably determines the presence of a temperature rise assist state when the reformer temperature is equal to or greater than a first predetermined temperature, and based on this determination the control means causes a transition to the next process even if the cell stack temperature does not satisfy the transition condition for transitioning to the next process.

When restarting, because it is difficult for heat produced by the partial oxidation reforming reaction in the POX process and ATR process to be removed by the heat storage means, the speed of the reformer temperature rise during the startup process increases faster than the rise of the cell stack temperature. Therefore if the system waits until the cell stack temperature satisfies the transition condition, there is a risk that the reformer temperature will rise excessively. For this reason, in the present invention if the reformer temperature reaches a forced transition temperature, an excessive temperature rise in the reformer can be prevented by early transition to the next process without waiting for the cell stack temperature to satisfy the transition condition.

In the present invention the first predetermined temperature is preferably set to a temperature higher than the reformer transition condition temperature.

In the present invention thus constituted, notwithstanding that the cell stack temperature is still lower than the transition condition temperature, when the reformer temperature reaches a high temperature state above the transition condition temperature (i.e., the forced transition temperature, which is the first predetermined temperature), a judgment can be made without error that there should be no further waiting for the cell stack temperature to rise further, and that a temperature rise assist state exists in which the amount of residual heat is large.

In the present invention the determining means preferably determines the presence of a temperature rise assist state in the SR process when the reformer temperature is equal to or greater than a first predetermined temperature, and the control means, based on this determination, causes a transition to the generating process even if the cell stack temperature does not satisfy the transition condition for transitioning to the next process; and the first predetermined temperature is set to be higher than the transition condition temperature of the reformer to the generating process, and lower than a second predetermined temperature, which is the reformer anomaly determination temperature.

Because the point of transition to the generating process (SR process) is the end of the startup process (i.e., the temperature rise process), the reformer temperature is most prone to reach a high temperature. Therefore using the present invention in a temperature rise assist state when the residual heat amount is large, the reformer can also be held below the anomaly determination temperature and made to operate in the normal operation temperature range after the generating process transition by causing the reformer to transition to electrical generation at a point below the anomaly determination temperature.

In the present invention, after the transition to the generating process the control means preferably executes temperature monitoring control to regulate the operation of the fuel cell device so that the reformer temperature does not exceed the second predetermined temperature, which is the reformer anomaly determination temperature.

In the temperature rise assist state, when the residual heat amount is large the reformer is brought into a state close to the anomaly determination temperature compared to normal startup. Therefore in the present invention, by executing temperature monitoring control so that the reformer temperature does not exceed the reformer anomaly determination temperature even after transition to the generating process, the reformer can be kept from going to a high temperature and surpassing the anomaly determination temperature at the start of electrical generation. Thus in the present invention excess temperature rises can be prevented even in a forced transition from the startup process to the generating process.

In the present invention the determining means preferably determines whether a temperature rise assist state exists by using the temperature of the reformer in the POX process or ATR process; if a temperature rise assist state is determined, transition conditions in that process and subsequently are relaxed.

The rise of the reformer temperature due to the residual heat amount is conspicuously manifested in the POX process and ATR process (especially the POX process) in which exothermic reactions are conducted, and there is a tendency for the temperature difference between the reformer temperature and the cell stack temperature which occurs at that time to be maintained in subsequent processes.

Therefore in the present invention the determination is made in the POX process or the ATR process, in which the temperature rise assist state caused by the residual heat amount can be accurately determined. Furthermore, following determination the reformer process switching temperature condition is switched at the time of the POX process or ATR process, therefore excess temperature rises can be prevented in the overall startup process even if a determination of an excess temperature rises caused by residual heat amount is not made at each subsequent switchover point from ATR process to SR process, and/or from SR process to generating process.

Effect of the Invention

In the solid oxide fuel cell device of the present invention, the temperature inside the fuel cell module can be prevented from rising excessively in the startup process.

BRIEF DESCRIPTION OF THE DRAWINGS

FIG. 8: A timing chart showing the operation when a fuel cell device is stopped according to an embodiment of the present invention.

FIG. 9: An operation table showing a startup procedure sequence for a fuel cell device according to an embodiment of the present invention.

FIG. 11: An operation table showing excess temperature rise suppression control in a fuel cell device according to a first embodiment of the present invention.

FIG. 13: An operation table showing excess temperature rise suppression control in a fuel cell device according to a second embodiment of the present invention.

FIG. 14: An explanatory diagram showing excess temperature rise suppression control at startup in a fuel cell device according to a third embodiment of the present invention.

FIG. 15: An operation table showing excess temperature rise suppression control in a fuel cell device according to a fourth embodiment of the present invention.

FIG. 17: An explanatory diagram showing excess temperature rise suppression control at startup in a fuel cell device according to a sixth embodiment of the present invention.

FIG. 18: An operation table showing excess temperature rise suppression control at startup in a fuel cell device according to a sixth embodiment of the present invention.

FIG. 19: An operation table showing excess temperature rise suppression control in a fuel cell device according to a sixth embodiment of the present invention.

FIG. 20: A control table for a fuel cell device according to a seventh embodiment of the present invention.

FIG. 21: A flow chart for control executed by a control unit.

DETAILED DESCRIPTION OF THE PREFERRED EMBODIMENTS

Next, referring to the attached drawings, a solid oxide fuel cell (SOFC) device according to an embodiment of the present invention will be explained.

Figure 1:
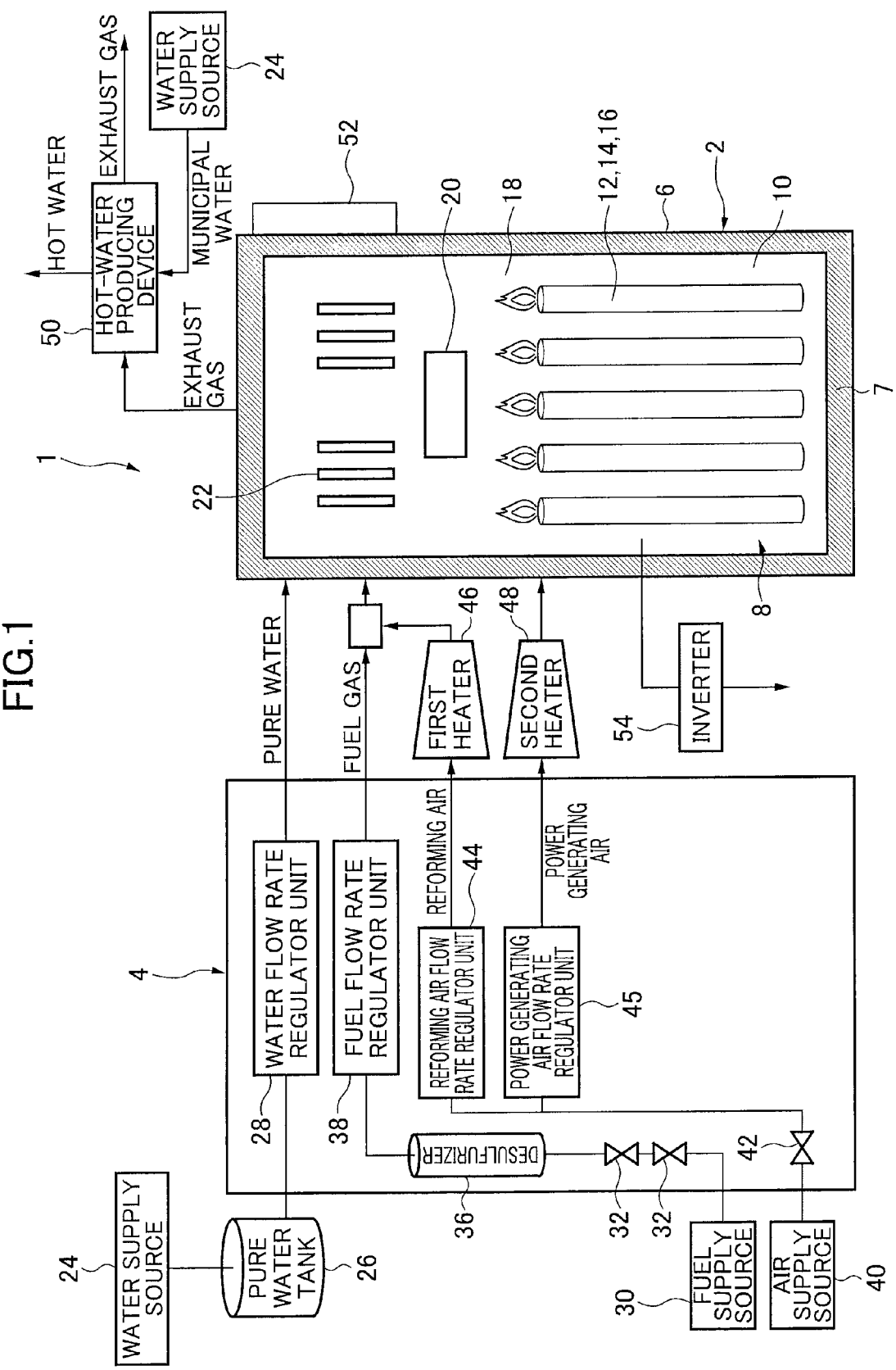
FIG. 1: An overview diagram showing a fuel cell device according to an embodiment of the present invention.

FIG. 1 is an overview diagram showing a solid oxide fuel cell (SOFC) device according to an embodiment of the present invention. As shown in FIG. 1, the solid oxide fuel cell (SOFC) device of this embodiment of the present invention is furnished with a fuel cell module 2 and an auxiliary unit 4.

The fuel cell module 2 is furnished with a housing 6 which is a heat storage material 7 is disposed around; a sealed space 8 is formed within the housing 6. Note that heat storage material 7 is capable of storing heat generated inside the fuel cell module 2, and is thus capable of improving the heat efficiency of the fuel cell module 2. A fuel cell assembly 12 for carrying out the electrical power generating reaction between fuel gas and oxidizer (air) is disposed in a power generating chamber 10 at the lower portion of this sealed space 8. This fuel cell assembly 12 is furnished with ten fuel cell stacks 14 (see FIG. 5), and the fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned power generating chamber 10 in the sealed space 8 of the fuel cell module 2. Residual fuel gas and residual oxidant (air) not used in the electrical generation reaction are burned in this combustion chamber 18 to produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving the heat of combustion and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate of water supplied from the reservoir tank. The auxiliary tank 4 is further furnished with a gas shutoff valve 32 for shutting off the fuel gas supplied from a fuel supply source 30 such as municipal gas or the like, a desulfurizer 36 for desulfurizing the fuel gas, and a fuel flow rate regulator unit 38 (a "fuel pump" or the like driven by a motor) for regulating the flow rate of fuel gas. Furthermore, the auxiliary unit 4 is furnished with an electromagnetic valve 42 for shutting off air serving as an oxidant and supplied from an air supply source 40, a reforming air flow rate regulator unit 44 and generating air flow rate regulator unit 45 ("air blower" or the like driven by a motor) for regulating air flow rate, a first heater 46 for heating a reforming air supplied to the reformer 20, and a second heater 48 for heating a generating air supplied to the power generating chamber. This first heater 46 and the second heater 48 are provided in order to efficiently raise the temperature at startup, and may be omitted.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater (not shown).

The fuel cell module 2 is provided with a control box 52 for controlling the supply flow rates of fuel gas and the like.

Furthermore, an inverter 54 serving as an electrical power extraction unit (electrical power conversion unit) for supplying electrical power generated by the fuel cell module to the outside is connected to the fuel cell module 2.

Figure 2:
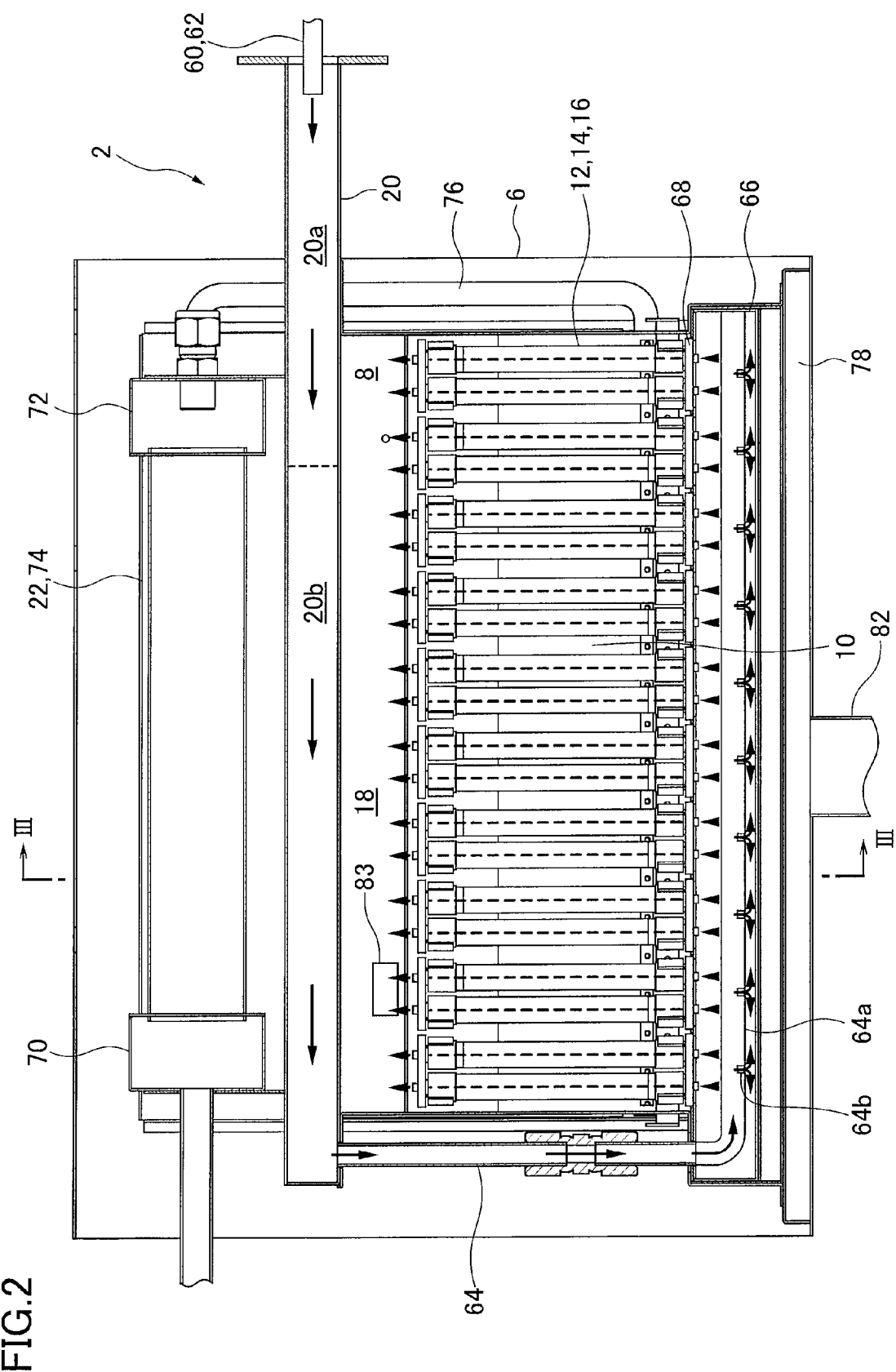
FIG. 2: A front elevation cross section showing a fuel cell module in a fuel cell device according to an embodiment of the present invention.
Figure 3:
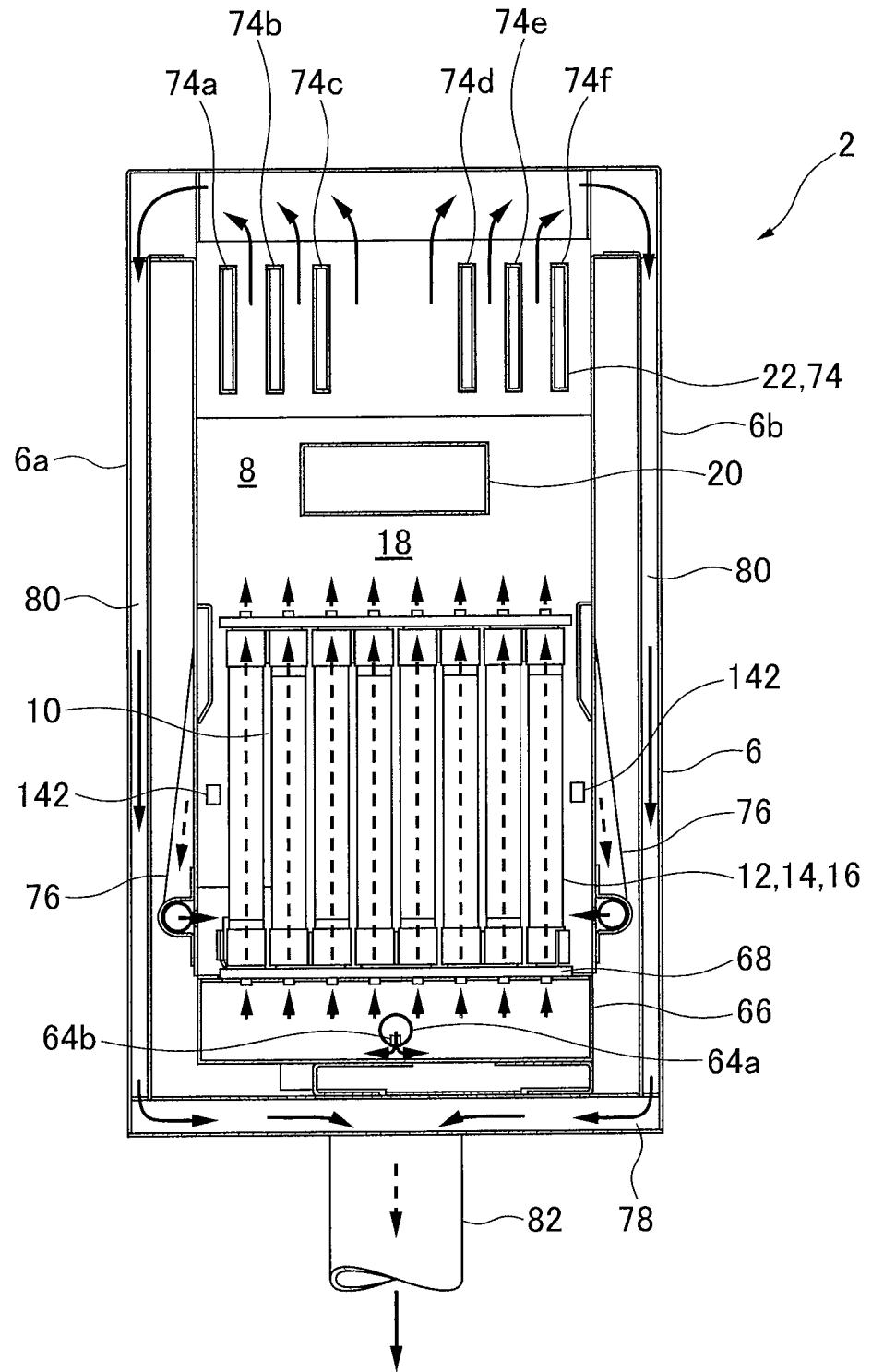
FIG. 3: A sectional diagram along line in FIG. 2.

The internal structure of the solid oxide fuel cell (SOFC) device according to the embodiment of the present invention is explained using FIGS. 2 and 3. FIG. 2 is a side elevation cross section showing the fuel cell module in a solid oxide fuel cell (SOFC) device according to an embodiment of the present invention, and FIG. 3 is a sectional diagram along line of FIG. 2.

As shown in FIGS. 2 and 3, the fuel cell assembly 12, the reformer 20, and the air heat exchanger 22 are arranged in sequence starting from the bottom in the sealed space 8 within the housing 6 of the fuel cell module 2, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of alumina spheres, or ruthenium is imparted to alumina spheres.

A fuel gas supply line 64 is connected to the downstream end of the reformer 20; this fuel gas supply line 64 extends downward, then further extends horizontally within a manifold 66 formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell units 16.

Next, the air heat exchanger 22 is provided over the reformer 20. This air heat exchanger 22 is furnished with an air concentration chamber 70 on the upstream side and two air distribution chambers 72 on the downstream side; the air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top end side of the exhaust gas conduit 80 communicates with the space in which the air heat exchanger 22 is disposed, and the bottom end side communicates with the exhaust gas chamber 78. An exhaust gas discharge pipe 82 is connected at approximately the center of the bottom surface of the exhaust gas chamber 78; the downstream end of this exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18.

Figure 4:
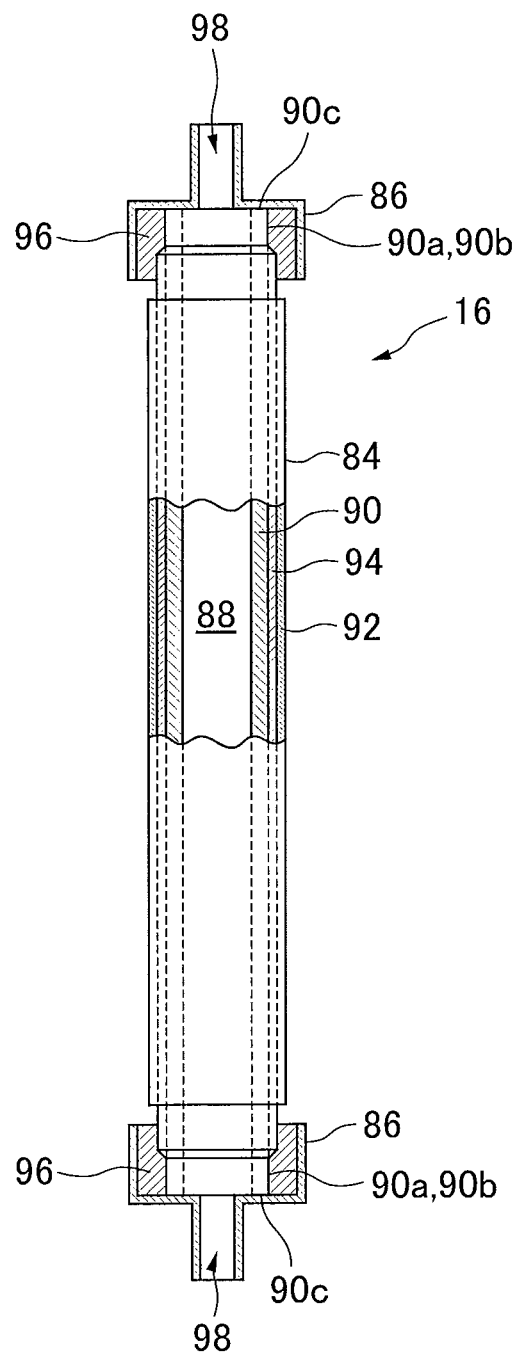
FIG. 4: A partial cross section showing an individual fuel cell unit in a fuel cell device according to an embodiment of the present invention.

Next, referring to FIG. 4, the fuel cell unit 16 will be explained. FIG. 4 is a partial cross section showing a fuel cell unit in a solid oxide fuel cell (SOFC) device according to an embodiment of the present invention.

As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. This internal electrode layer 90 is a fuel electrode through which fuel gas passes, and is a (−) pole, while the external electrode layer 92 is an air electrode for contacting the air, and is a (+) pole.

The internal electrode terminals 86 attached at the top end and bottom end of the fuel cell unit 16 have the same structure, therefore the internal electrode terminal 86 attached at the top end side will be specifically explained. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 19 by making direct contact with the top end surface 90c of the inside electrode layer 90. A fuel gas flow path 98 communicating with a fuel gas flow path 88 in the inside electrode layer 90 is formed at the center portion of the inside electrode terminal 86.

The inside electrode layer 90 is formed, for example, from at least one of a mixture of Ni and zirconia doped with at least one type of rare earth element selected from Ca, Y, Sc, or the like; or a mixture of Ni and ceria doped with at least one type of rare earth element; or any mixture of Ni with lanthanum gallate doped with at least one element selected from Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; silver, or the like.

Figure 5:
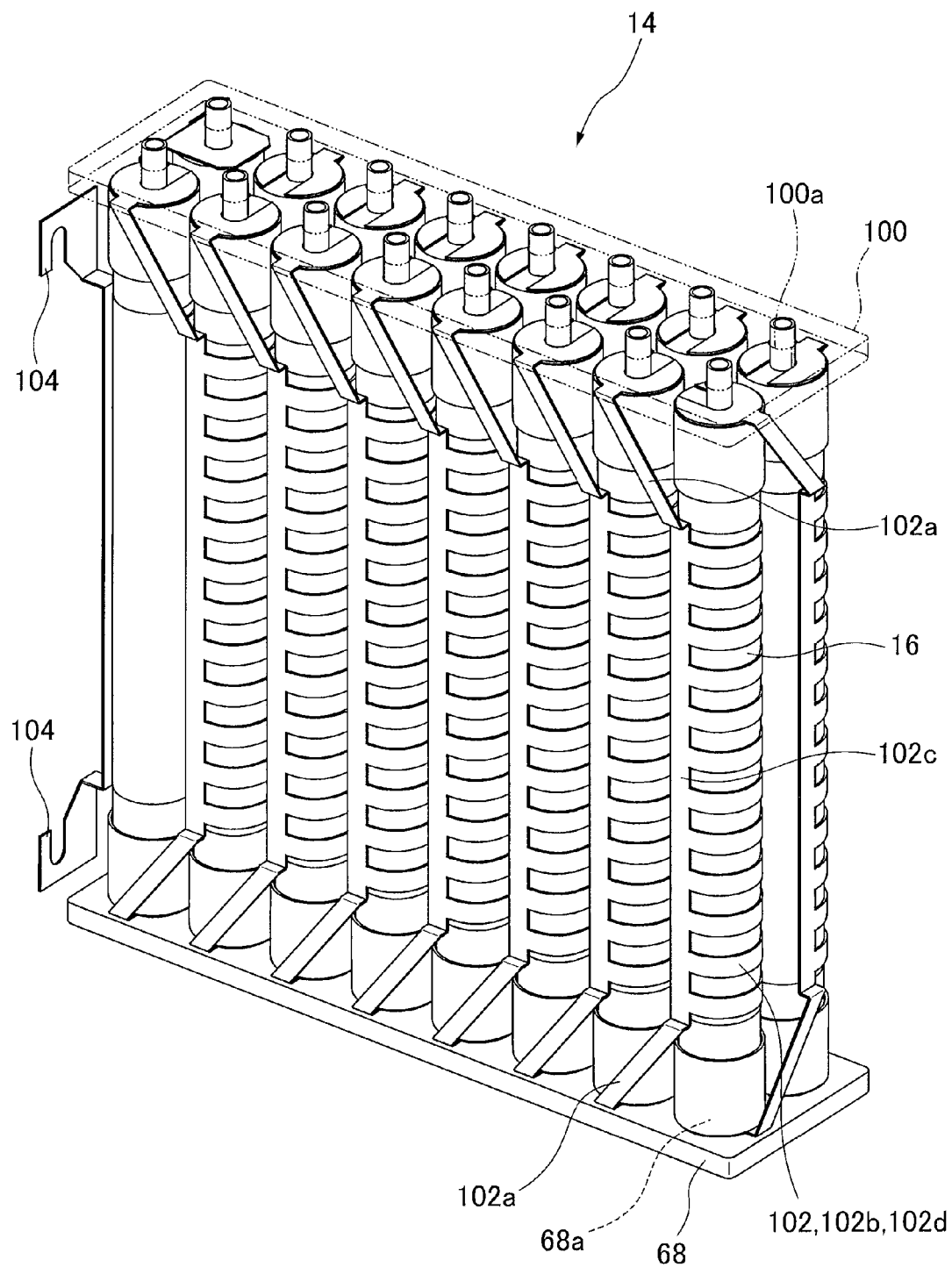
FIG. 5: A perspective view showing a fuel cell stack in a fuel cell device according to an embodiment of the present invention.

Next, referring to FIG. 5, the fuel cell stack 14 will be explained. FIG. 5 is a perspective view showing a fuel cell stack in a solid oxide fuel cell (SOFC) device according to an embodiment of the present invention.

As shown in FIG. 5, the fuel cell stack 14 is furnished with sixteen fuel cell units 16; the top and bottom insides of these fuel cell units 16 are respectively supported by a lower support plate 68 and upper support plate 100. Through holes 68a and 100a, through which the inside electrode terminal 86 can penetrate, are provided on the lower support plate 68 and outer support plate 100.

In addition, a current collector 102 and an external terminal 104 are attached to the fuel cell unit 16. The current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from the vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, inside electrode terminals 86 at the top and bottom ends of the two fuel cell units 16 positioned at the end of the fuel cell stack 14 (at the front and back sides on the left edge in FIG. 5) are respectively connected to the external terminals 104. These external terminals 104 are connected to the external terminals 104 (not shown) at the ends of the adjacent fuel cell stack 14, and as described above, all of the 160 fuel cell units 16 are connected in series.

Figure 6:
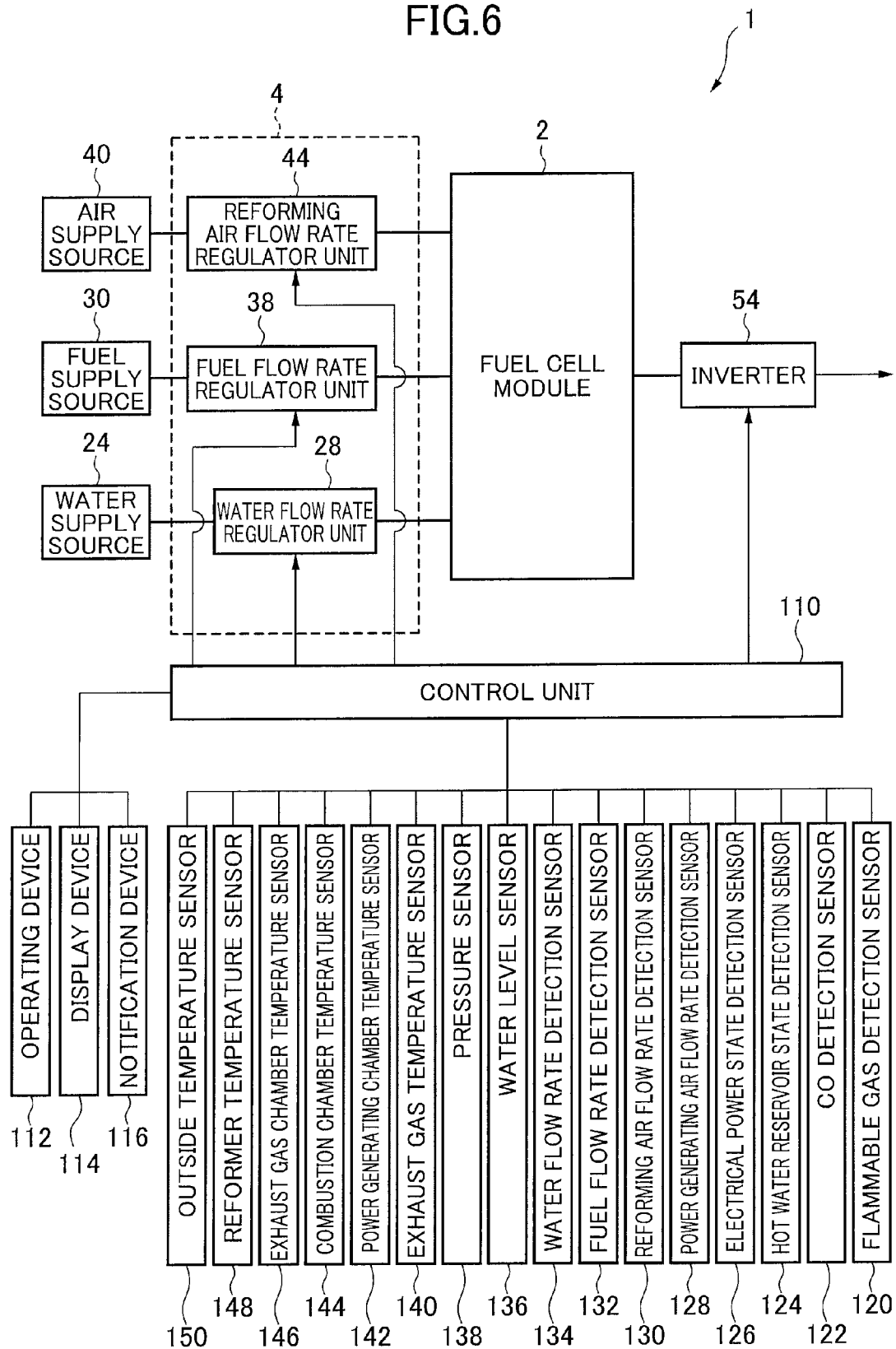
FIG. 6: A block diagram showing a fuel cell device according to an embodiment of the present invention.

Next, referring to FIG. 6, the sensors attached to the solid oxide fuel cell (SOFC) device according to the embodiment of the present invention will be explained. FIG. 6 is a block diagram showing a solid oxide fuel cell (SOFC) device according to an embodiment of the present invention.

As shown in FIG. 6, the solid oxide fuel cell device 1 is furnished with a control unit 110; an operating device 112 provided with operating buttons such as "ON" or "OFF" for user operation, a display device 114 for displaying various data such as a generator output value (Watts), and a notification device 116 for issuing warnings during abnormal states and the like are connected to the control unit 110. The notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of a CO detection sensor 122 is to detect leakage of CO in the exhaust gas, which is meant to be exhausted to the outside via the exhaust gas conduit 80 and the like, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A power generator air flow rate detection sensor 128 detects the flow rate of power generator air supplied to the generating chamber 10.

A reforming air flow rate sensor 130 detects the flow rate of reforming air supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the temperature of the reformer 20 from the intake and exit temperatures on the reformer 20.

If the solid oxide fuel cell (SOFC) device is placed outdoors, the outside temperature sensor 150 detects the temperature of the outside atmosphere. Sensors to detect outside atmospheric humidity and the like may also be provided.

Signals from these various sensors are sent to the control unit 110; the control unit 110 sends control signals to the water flow rate regulator unit 28, the fuel flow rate regulator unit 38, the reforming air flow rate regulator unit 44, and the power generating air flow rate regulator unit 45 based on data from the sensors, and controls the flow rate in each of these units.

The control unit 110 sends control signals to the inverter 54 to control the supplied electrical power.

Figure 7:
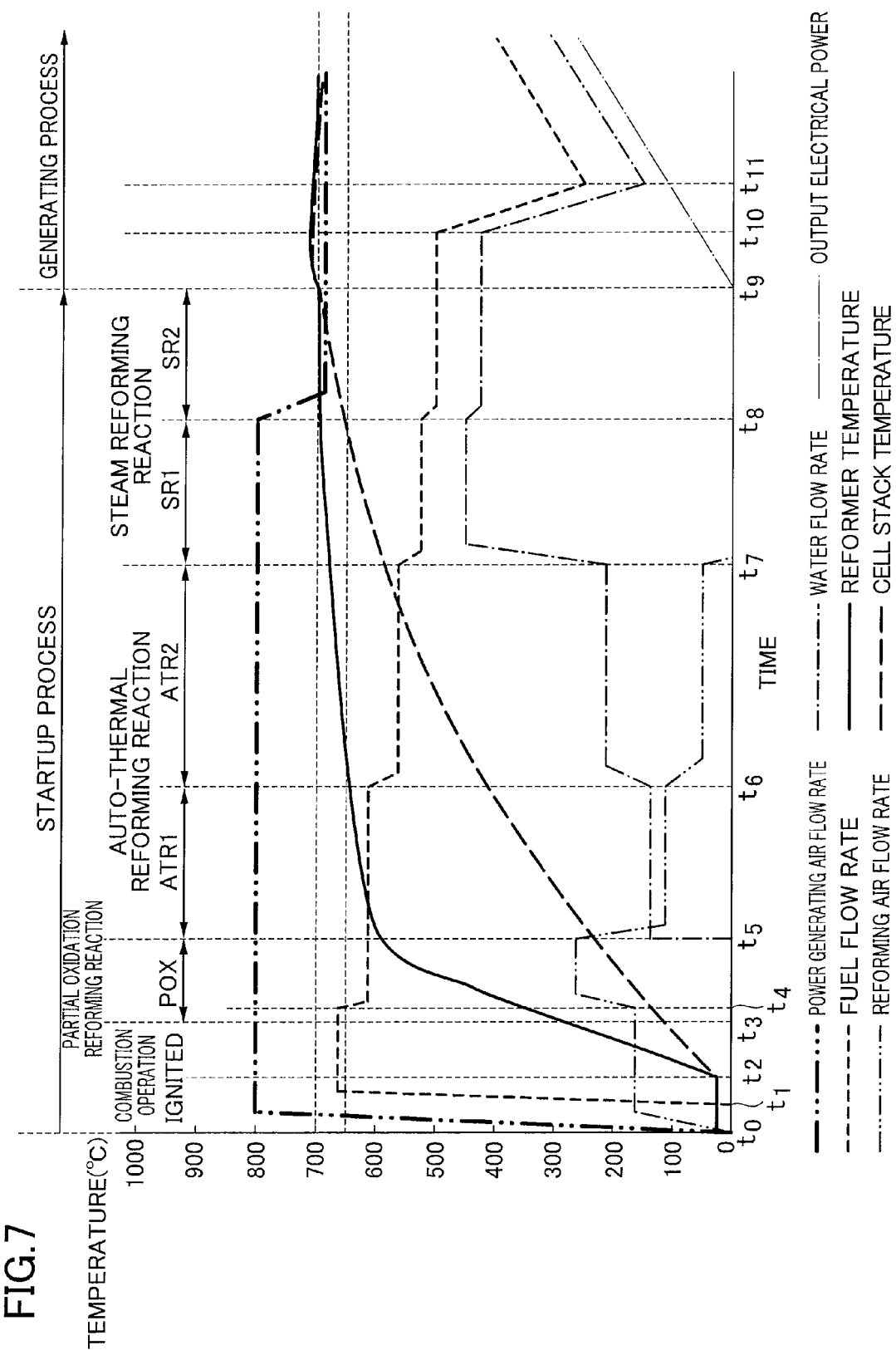
FIG. 7: A timing chart showing the operation at startup of a fuel cell device according to an embodiment of the present invention.

Next, referring to FIG. 7, the operation of a solid oxide fuel cell (SOFC) device according to the present embodiment at the time of start up will be explained. FIG. 7 is a timing chart showing the operations at start up of a solid oxide fuel cell (SOFC) device according to an embodiment of the present invention.

At the beginning, in order to warm up the fuel cell module 2, the operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 to the reformer 20 on the fuel cell module 2 via the first heater 46. At the same time, power generating air is supplied from the generating air flow rate regulator unit 45 to the air heat exchanger 22 of the fuel cell module 2 via the second heater 48, and the power generating air reaches the generating chamber 10 and the combustion chamber 18.

Immediately thereafter, fuel gas is also supplied from the fuel flow rate regulator unit 38, and fuel gas into which reforming air is blended passes through the reformer 20, the fuel cell stack 14, and the fuel cell units 16 to reach the combustion chamber 18.

Next, ignition is brought about by the ignition device 83, and fuel gas and air (reforming air and power generating air) supplied to the combustion chamber 18 is combusted. This combustion of fuel gas and air produces exhaust gas; the generating chamber 10 is warmed by the exhaust gas, and when the exhaust gas rises in the sealed space 8 of the fuel cell module 2, the fuel gas, which includes the reforming air in the reformer 20 is warmed, as is the power generating air inside the air heat exchanger 22.

At this point, fuel gas into which reforming air is blended is supplied to the reformer 20 by the fuel flow rate regulator unit 38 and the reforming air flow rate regulator unit 44, therefore the partial oxidation reforming reaction POX given by Expression (1) proceeds in the reformer 20. This partial oxidation reforming reaction POX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the combustion chamber 18 is also heated by the combustion of the fuel gas and air, so that the fuel cell stack 14 is also heated from above, thereby enabling an essentially uniform rise in temperature in the vertical direction of the fuel cell stack 14. Even though the partial oxidation reforming reaction POX is progressing, the ongoing combustion reaction between fuel gas and air is continued in the combustion chamber 18.

$$C_mH_n + xO_2 \rightarrow aCO_2 + bCO + cH_2 \qquad (1)$$

After the start of the partial oxidation reforming reaction POX, based on the temperature of the reformer 20 detected by the reformer temperature sensor 148 and the temperature of the fuel cell stack 14 detected by generating chamber temperature sensor 142, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction POX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction POX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, no major drop in temperature will be caused. Also, the combustion reaction continues within the combustion chamber 18 even as the auto-thermal reforming reaction ATR proceeds.

After starting the auto-thermal reforming reaction ATR shown in Equation (2), supply of reforming air by the reform air flow rate regulator unit 44 is stopped, and supply of steam by the water flow rate regulator unit 28 is increased based on the temperature of the reformer 20 detected by the reformer temperature sensor 148 and the temperature of the fuel cell stack 14 detected by the generating chamber temperature sensor 142. By this means, a gas containing no air and only containing fuel gas and steam is supplied to the reformer 20, where the steam reforming reaction SR of Expression (3) proceeds.

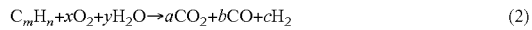

$$C_mH_n + xO_2 + yH_2O \rightarrow aCO_2 + bCO + cH_2 \qquad (2)$$

$$C_mH_n + xH_2O \rightarrow aCO_2 + bCO + cH_2 \qquad (3)$$

This steam reforming reaction SR is an endothermic reaction, therefore the reaction proceeds as a thermal balance is maintained with the combustion heat from the combustion chamber 18. At this stage, the fuel cell module 2 is in the final stages of startup, therefore the temperature has risen to a sufficiently high level within the generating chamber 10 so that no major temperature drop is induced in the power generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction POX, the auto-thermal reforming reaction ATR, and the steam reforming reaction SR which proceed in that sequence. After the above startup processing is completed, electrical power is extracted from the fuel cell module 2 to the inverter 54. That is, electrical power generation is started. Generation of electricity by the fuel cell module 2 causes the fuel cell 84 itself to emit heat, such that the temperature of the fuel cell 84 rises.

After the start of the power generation, fuel gas and air having respective flow rates greater than those consumed by the fuel cell 84 is applied in order to maintain the rated temperature and continue combustion inside the combustion chamber 18. Generation of electricity by the high reform-efficiency steam reforming reaction SR proceeds while electricity is being generated.

Next, referring to FIG. 8, the operation upon stopping the solid oxide fuel cell (SOFC) device according to the embodiment of the present invention will be explained. FIG. 8 is a timing chart showing the action when operation of a solid oxide fuel cell (SOFC) device according to an embodiment of the present invention is stopped.

As shown in FIG. 8, when stopping the operation of the fuel cell module 2, the fuel flow rate regulator unit 38 and the water flow rate regulator unit 28 are first operated to reduce the flow rate of fuel gas and steam being supplied to the reformer 20.

When stopping the operation of the fuel cell module 2, the flow rate of power generating air supplied by the power generating air flow rate regulator unit 45 into the fuel cell module 2 is being increased at the same time that the flow rate of fuel gas and steam being supplied to the reformer 20 is being reduced; the fuel cell assembly 12 and the reformer 20 are air cooled to reduce their temperature. Thereafter when the temperature of the generating chamber has dropped to a predetermined temperature, for example to 400° C., the supply of fuel gas and steam to the reformer 20 is stopped, and the steam reforming reaction SR in the reformer 20 ends. Supply of power generating air continues until the temperature in the reformer 20 drops to a predetermined temperature, e.g. 200° C.; when the predetermined temperature is reached, the supply of power generating air from the power generating air flow regulator unit 45 is stopped.

Thus in the embodiment of the present invention, the steam reforming reaction SR by the reformer 20 and cooling by power generating air are used in combination, therefore when the operation of the fuel cell module 2 is stopped, that operation can be stopped relatively quickly.

Next, referring to FIGS. 7 and 9, we discuss details of the operation of a solid oxide fuel cell (SOFC) according to the present embodiment at the time of startup.

FIG. 9 is an operation table for the basis of the startup processing procedure of the solid oxide fuel cell 1; it is used when there is no risk of the excess temperature rise described below in a state of amount of residual heat remaining in the fuel cell module 2 being at or below a predetermined amount upon startup.

As shown in FIG. 9, in the startup process the control unit 110 executes each of the operating control states (the combustion operating process, POX1 process, POX2 process, ATR1 process, ATR2 process, SR1 process, SR2 process) in temporal sequence and transitions to the generating process.

Note that the POX 1 process and POX2 process are processes in which a partial oxidation reforming reaction is carried out inside the reformer 20. The POX 1 process and POX2 process are processes in which auto thermal reforming reaction is carried out inside the reformer 20. The SR1 process and SR2 process are processes in which a steam reforming reaction is carried out inside the reformer 20. Each of the above POX, ATR, and SR processes is respectively subdivided in two, but these may be subdivided into three or more without such limitation, and an unsubdivided constitution is also possible.

First if solid oxide fuel cell 1 is started at time $t_0$, the control unit 110 sends a signal to the reforming air flow rate regulator unit 44 and the generating air flow regulator unit 45 starting those up and supplying reforming air (oxidant gas) and generating air to the fuel cell module 2. Note that in the present embodiment, at time $t_0$, the reforming air supply amount at which supply starts set to 10.0 (L/min), while the generating air supply amount is set to 100.0 (L/min) (see FIG. 9 "Combustion Operation" process).

Next, at time $t_1$, the control unit 110 sends a signal to the fuel flow rate regulator unit 38 and starts the supply of fuel gas to the reformer 20. Fuel gas and reforming air fed into the reformer 20 are thus fed into each of the individual fuel cell units 16 via fuel gas supply pipe 64 and manifold 66. Fuel gas and reforming air fed into each of the individual fuel cell units 16 flow out from the top end of the gas flow paths 98 on each of the individual fuel cell units 16. Note that at time $t_1$, the fuel gas amount at which supply is started is set to 6.0 (L/min) (see FIG. 9 "Combustion Operation" process).

Furthermore, at time $t_2$, the control unit 110 sends a signal to the ignition device 83 and ignites the fuel gas flowing out from individual fuel cell units 16. Fuel gas inside the combustion chamber 18 is thus combusted, and the exhaust gas produced thereby causes the reformer 20 disposed thereabove to be heated, also raising the temperature of the combustion chamber 18, the generating chamber 10, and the fuel cell stacks 14 disposed inside of same ("cell stack temperature" below) (see times $t_2$ through $t_3$ in FIG. 7). The individual fuel cell units 16 including the gas flow paths 98 and the top end locations thereof correspond to the combustion portion.

When the temperature of the reformer 20 (the "reformer temperature" below) is raised by the heating of the reformer 20 to approximately 300° C., a partial oxidation reforming reaction (POX) occurs inside the reformer 20 (FIG. 7 time $t_3$: POX1 process start). Because the partial oxidation reforming reaction is an exothermic reaction, the reformer 20 is heated by the reaction heat produced by the partial oxidation reforming reaction (FIG. 7, time $t_3$ to $t_5$).

When the temperature further rises and the reformer temperature reaches 350° C. (the POX2 transition condition), the control unit 110 sends a signal to the fuel flow rate regulator unit 38 reducing the amount of fuel gas supplied, and sends a signal to the reforming air flow rate regulator unit 44 increasing the amount of reforming air supplied (FIG. 7 time $t_4$: POX2 process start). The amount of fuel gas supplied is thus changed to 5.0 (L/min), and the amount of reforming air supplied is changed to 18.0 (L/min). (See FIG. 9, "POX2" process). These supply amounts are suited to producing a partial oxidation reforming reaction. In other words, in the initial temperature region at which the partial oxidation reforming reaction begins to occur, increasing the proportion of fuel gas supplied forms a state in which fuel gas is reliably ignited, and maintaining that supply amount stabilizes ignition (See FIG. 9, "POX1" process). Moreover, after stable ignition and temperature rise, wastage of gas is suppressed by setting the amount of fuel gas to an amount necessary and sufficient for producing the partial oxidation reforming reaction (see FIG. 9, "POX2" process).

Next, at time $t_5$ in FIG. 7, when the reformer temperature reaches 600° C. or above, and the cell stack temperature reaches 250° C. or above (the ATR1 transition condition), the control unit 110 sends a signal to the reforming air flow rate regulator unit 44 reducing the amount of reforming air supplied, while also sending a signal to the water flow rate regulator unit 28 starting the supply of water (ATR1 process start). The reforming air supply amount is thus changed to 8.0 (L/min), and the amount of water supplied is set to 2.0 (cc/min) (see FIG. 9, "ATR1" process). The introduction of water (steam) into the reformer 20 causes a steam reforming reaction to also be produced inside reformer 20. That is, in the "ATR1" process of FIG. 9 an auto thermal reforming reaction (ATR) occurs in which the partial oxidation reforming reaction and the steam reforming reaction are mixed.

In the present embodiment the cell stack temperature is measured by generating chamber temperature sensors 142 disposed within the generating chamber 10. The temperature inside the generating chamber and the cell stack temperature are not precisely speaking identical, but the temperature detected by the generating chamber temperature sensor reflects the cell stack temperature, and the cell stack temperature can be grasped using the generating chamber temperature sensor disposed inside the generating chamber. Note that in the present Specification, the cell stack temperature means a temperature measured by any desired sensor indicating a value reflecting the cell stack temperature.

In addition, at time $t_6$ in FIG. 7, when the reformer temperature reaches 600° C. or above, and the cell stack temperature reaches 400° C. or above (the ATR2 transition condition), the control unit 110 sends a signal to the fuel gas flow rate regulator unit 38 reducing the amount of fuel gas supplied. Also, the control unit 110 sends a signal to the reforming air flow rate regulator unit 44 reducing the amount of reforming air supplied, while also sending a signal to the water flow rate regulator unit 28 increasing the amount of water supplied (ATR2 process start). The amount of fuel gas supplied is thus changed to 4.0 (L/min), the amount of reforming air supplied is changed to 4.0 (L/min), and the amount of water supplied is changed to 3.0 (cc/min) (See FIG. 9, "ATR2" process). Inside the reformer 20, the reduction in the reforming air supply amount and increase in the water supply amount cause the proportion of the exothermic partial oxidation reforming reaction in the reformer 20 to decrease, and the proportion of the endothermic steam reforming reaction to increase. A rise in the reformer temperature is thus suppressed, while the raising of the temperature of the fuel cell stack 14 by the flow of gas received from reformer 20 causes the cell stack temperature to rise so as to catch up with the reformer temperature, so that the temperature difference between the two is reduced, and the temperature of both is stably raised.

Next, at time $t_7$ in FIG. 7, the temperature difference between the reformer temperature and the cell stack temperature shrinks, and when the reformer temperature reaches 650° C. or above, and the cell stack temperature reaches 600° C. or above (the SR2 transition condition), the control unit 110 sends a signal to the reforming air flow rate regulator unit 44, stopping the supply of reforming air. Also, the control unit 110 sends a signal to the fuel gas flow rate regulator unit 38 reducing the amount of fuel gas supplied, while also sending a signal to the water flow rate regulator unit 28 increasing the amount of water supplied (SR1 process start). The fuel gas supply amount is thus changed to 3.0 (L/min), and the amount of water supplied is changed to 8.0 (cc/min) (see FIG. 9, "SR1" process). Stopping of the supply of reforming air results in a cessation of the partial oxidation reforming reaction inside the reformer 20, and an SR is started in which only the steam reforming reaction occurs.

Moreover, at time $t_8$ in FIG. 7, the temperature difference between the reformer temperature and the cell stack temperature shrinks further, and when the reformer temperature reaches 650° C. or above, and the cell stack temperature reaches 650° C. or above (the SR2 transition condition), the control unit 110 sends a signal to the fuel gas flow rate regulator unit 38 reducing the fuel gas supply amount, and sends a signal to the water flow rate regulator unit 28 reducing the water supply amount. The control unit 110 then sends a signal to the generating air flow rate regulator unit 45 reducing the generating air supply amount as well (SR2 process start). The fuel gas supply amount is thus changed to 2.3 (L/min), the amount of water supplied is changed to 6.3 (cc/min), and the amount of generating air supplied is changed to 80.0 (L/min) (see FIG. 9, "SR2" process).

In the SR1 process, the reformer temperature and cell stack temperature are raised to close to the temperature at which electrical generation is possible, therefore the fuel gas supply amount and water supply amount are held at a higher level. Thereafter in the SR2 process the fuel gas supply amount and water supply amount are reduced, the reformer temperature and cell stack temperature distribution is caused to stabilize, and the temperature is stabilized to the range at which electrical generation is possible.

In the SR2 process, the control unit 110 maintains each supply amount for a predetermined generating transition time, then at time $t_9$ in FIG. 7, when the reformer temperature has reached 650° C. or above and the stack temperature has reached 700° C. (the generating process transition condition), causes power to be output by the inverter 54 from the fuel cell module 2, transitions to the power generating process, and starts electrical power generation (FIG. 7, time $t_9$: generating process start). In the generating process the control unit 110 holds the fuel gas supply amount and water supply amount fixed from time $t_9$ to time $t_{10}$.

Thereafter, the control unit 110 sends signals to the fuel flow rate regulator unit 38 and the water flow rate regulator unit 28 to change the fuel gas and water supply amounts to follow output power. Therefore from time $t_{10}$ to time $t_{11}$, the fuel gas supply amount and water supply amount are reduced, and at time $t_{11}$ and beyond the fuel gas supply amount and water supply amount are adjusted in response to output demand, and a following operation is executed.

Figure 10:
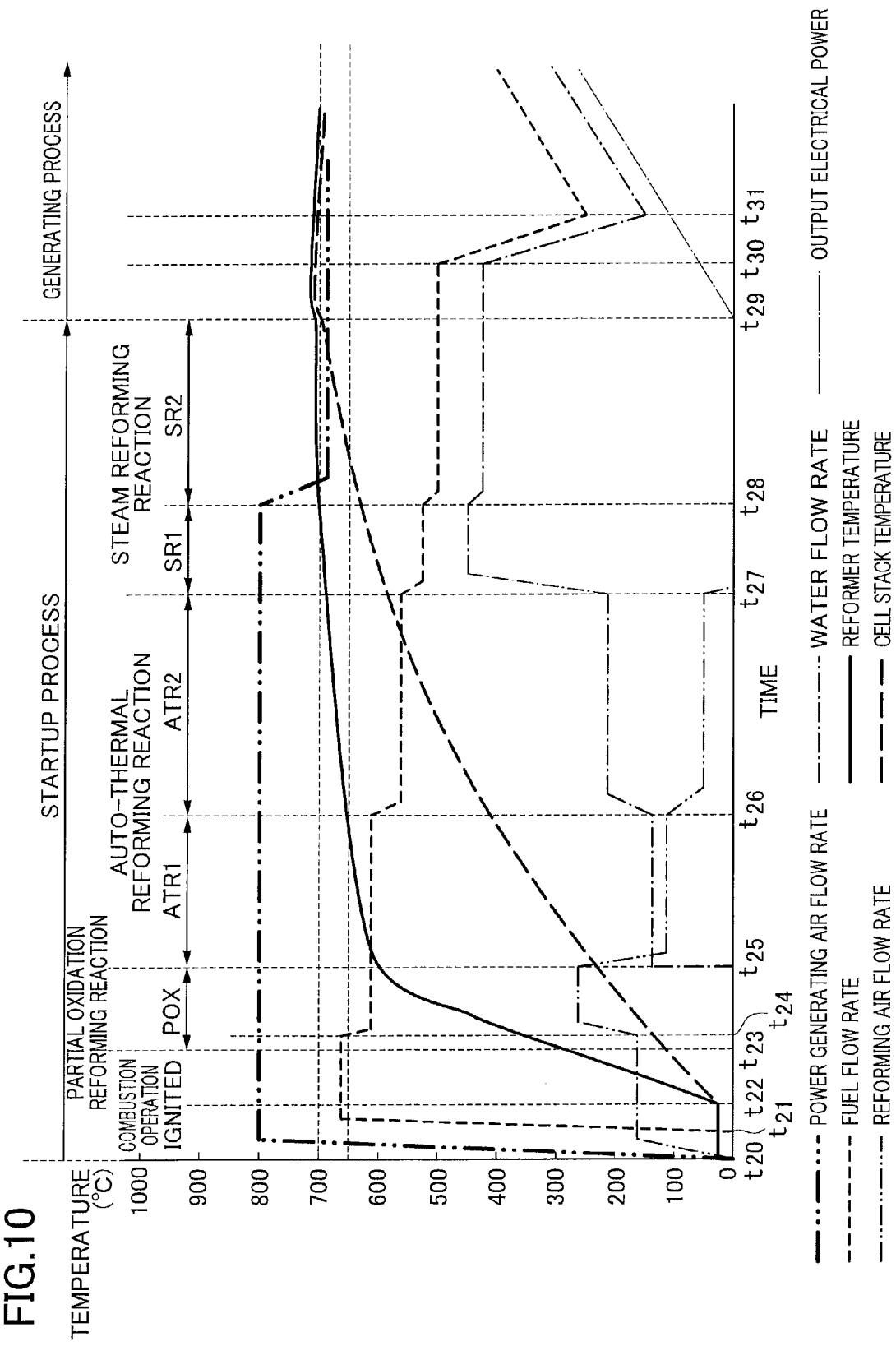
FIG. 10: An explanatory diagram showing excess temperature rise suppression control at startup in a fuel cell device according to an embodiment of the present invention.

Next, referring to FIGS. 10 and 11, we explain excess temperature rise suppression control in a solid oxide fuel cell (SOFC) device according to a first embodiment.

As described above, the fuel cell module 2 is constituted such that the heat storage material 7 as a heat storage means is provided around the housing 6 serving as module housing chamber in order to improve thermal efficiency, and internally produced heat can be effectively used without being released to the outside.

However, when the fuel cell device 1 is being operated and then a stop operation is entered in a state whereby the entirety of the fuel cell module 2 including the heat storage material 7 is in an elevated temperature state, and then subsequently the system enters a restart process in a state whereby a large amount of heat is accumulated in the heat storage material 7 and the like, the temperature of constituent parts (especially reformer 20) in the fuel cell module 2 rises more easily compared to a normal startup after being at room temperature. For example, in a partial oxidation reforming reaction, which is an exothermic reaction, heat produced by the reformer 20 during normal startup from room temperature heats not only the reformer 20 itself but is also released outside the reformer 20 to raise the temperature of other constituent parts, the heat storage material 7, and the like. However in a situation in which the heat storage material 7 is holding a large amount of heat, the heat produced in the partial oxidation reforming reaction is primarily used to raise the temperature of the reformer 20, and the speed of the temperature rise in the reformer 20 is increased. This leads, for example, to the risk of degradation to the reformer 20 due to an excess temperature rise.

Therefore in the present embodiment, the status as to whether there is a risk of this type of excessive temperature rise occurring (i.e., a temperature rise assist state) is sensed, and in response to this state, excess temperature rise suppression control is executed and an appropriate restart is implemented in which excess temperature rise is prevented. Under this excess temperature rise suppression control, when a temperature rise assist state is sensed, transition temperature conditions are relaxed for an early transition from the SR1 process to the SR2 process.

Compared to FIG. 7, FIG. 10 shows the case of a higher rate of increase in reformer temperature. Below we explain primarily the points of difference relative to the normal startup operation and processing described in FIGS. 7 through 9.

Compared to FIG. 9, in FIG. 11 only the transition temperature conditions differ; fuel gas supply amounts, etc. in each process have the same settings. Note that in the operation tables from FIG. 11 forward, the parts differing from FIG. 9 are called out by squares.

The startup state from time $t_{20}$ to time $t_{27}$ is essentially the same as the startup state from time $t_0$ to time $t_7$ in FIG. 7, hence an explanation thereof is here omitted.

The temperature rise of the reformer 20 is faster than that of the fuel cell stack 14, therefore the temperature of the reformer 20 before time $t_{27}$ exceeds 650° C., which is the temperature condition for transitioning from the ATR2 process to the SR1 process. At time $t_{27}$, when the cell stack temperature reaches the transition temperature condition of 600° C., both transition conditions are met, therefore the control unit 110 causes a transition from the ATR2 process to the SR1 process.

The normal condition for transitioning from the SR1 process to the SR2 process is that the reformer temperature be 650° C. or greater, and the cell stack temperature be 650° C. or greater (the SR2 transition condition). The reformer temperature continues to rise after transition to the SR1 process, and at time $t_{28}$ surpasses the temperature condition of 650° C. for transition to SR2, reaching a predetermined forced transition temperature (in this example, 700° C.). At the same time, the cell stack temperature has not reached the temperature condition of 650° C. for transition to SR2 even at time $t_{28}$.

Some time is required until the cell stack temperature reaches 650° C. or greater after the reformer temperature first reaches 650° C. or greater, so there is a risk that when the cell stack temperature reaches 650° C. or greater the reformer temperature may, due to excess temperature rise, reach the anomaly determination temperature of 800° C. Since the anomaly determination temperature poses a risk of degradation and damage to the reformer 20, this is a temperature setting for an emergency forced stop of the fuel cell 1.

If the reformer temperature reaches the forced transition temperature (in this example 700° C.), notwithstanding that in the SR1 process the cell stack temperature has not reached the SR2 process transition temperature condition, the control unit 110 as determining means determines that it has departed from the transition temperature rise process which forms the basis for the reformer temperatures and the cell stack temperatures shown in the operation table of FIG. 9; the speed of the reformer temperature rise is increasing, therefore a large amount of heat is accumulated in fuel cell module 2, and due to this heat amount the temperature rise in the reformer 20 is in an assisted state, or the speed of the temperature rise is increased compared to normal startup, i.e., it is in a temperature rise assist state.

In other words in the present embodiment a determination of a temperature rise assist state is made if the speed of the reformer temperature rise is fast compared to the speed of the cell stack temperature rise, the temperature difference between the two is larger than normal, and the reformer temperature reaches a forced transition temperature, which is a predetermined temperature above the transition condition, before the cell stack temperature reaches the transition temperature.

The control unit 110 thus makes an addition or change to the temperature condition for transitioning from the SR1 process to the SR2 process, so that in addition to the reformer temperature being 650° C. or greater and the cell stack temperature being 650° C. or greater, the reformer temperature can also be 700° C. or greater, regardless of the cell stack temperature (the changed SR2 transition condition). Hence while the cell stack temperature has not reached 650° C., the reformer temperature has reached the forced transition temperature (700° C.), so the control unit 110 causes a transition from the SR1 process to the SR2 process.

Therefore in the case shown in FIG. 10, the SR1 process period during which the fuel gas supply amount and water supply amount are higher than the SR2 process is shortened, and the temperature rise in the reformer 20 is suppressed. Furthermore, after transitioning to the SR2 process the fuel gas supply amount and water supply amount are reduced to less than the SR1 process, so a rise in reformer temperature is suppressed.

The fuel gas supply amount and water supply amount are reduced more in the SR2 process than in the SR1 process, so with respect to the suppression of the endothermic steam reforming reaction, this is disadvantageous as a temperature rise suppression effect on the reformer temperature. However the amount of post-reformed fuel gas outflowing from individual fuel cell units 16, and the amount of exhaust gas from the combustion portion heating the reformer 20, are reduced by the reduction in the fuel gas supply amount in the SR2 process, therefore as whole the rise in reformer temperature is suppressed.

On the other hand by receiving a gas flow from the reformer 20 in the SR2 process, the cell stack temperature rises so as to gradually catch up with the reformer temperature and reach the temperature at which electrical generation is possible. The reformer temperature and cell stack temperature thus satisfy the respective transition temperature conditions (generating process transition conditions) of 650° C. or greater and 700° C. or greater at time $t_{29}$, and the control unit 110 causes a transition from the SR2 process to the generating process.

When transitioning to the generating process, the cell stack temperature rises due to the generating reaction in the fuel cell stack 14. In conjunction with this, the reformer temperature also rises. In the present embodiment, taking into account the reformer and the cell stack temperature rise and the like in such a generating process, the reformer temperature and cell stack temperature are kept from exceeding their respective predetermined values (for example the anomaly determination temperatures at which there is a risk of degradation or damage to the reformer 20 or the fuel cell stack 14) during transition to the generating process and for a predetermined period after transition to the generating process.

In this manner, under the excess temperature rise suppression control of the present embodiment, if the speed of the reformer temperature rise is faster than the speed of the cell stack temperature rise, by changing the transition temperature conditions, an early transition to the next process is accomplished when the reformer temperature reaches a forced transition temperature set higher than the normal transition temperature condition, even when the cell stack temperature does not satisfy the transition temperature condition. Thus in the present embodiment the rise in reformer temperature is suppressed, and during the startup process which include the SR process and the generating process, especially at the time of transition to the generating process and during a predetermined period following transition to the generating process, a situation where the reformer temperature and the cell stack temperature are over raised to or above a predetermined value (the anomaly determination temperature) at which degradation and damage could occur, can be prevented.

Note that in the present embodiment a temperature rise assist state is determined in the SR process, and temperature conditions for transitioning from the SR1 process to the SR2 process are changed, but without such limitation a temperature rise assist state may also be determined in the POX process or the ATR process, and the transition temperature conditions can be changed for early transition to the next process.

Figure 12:
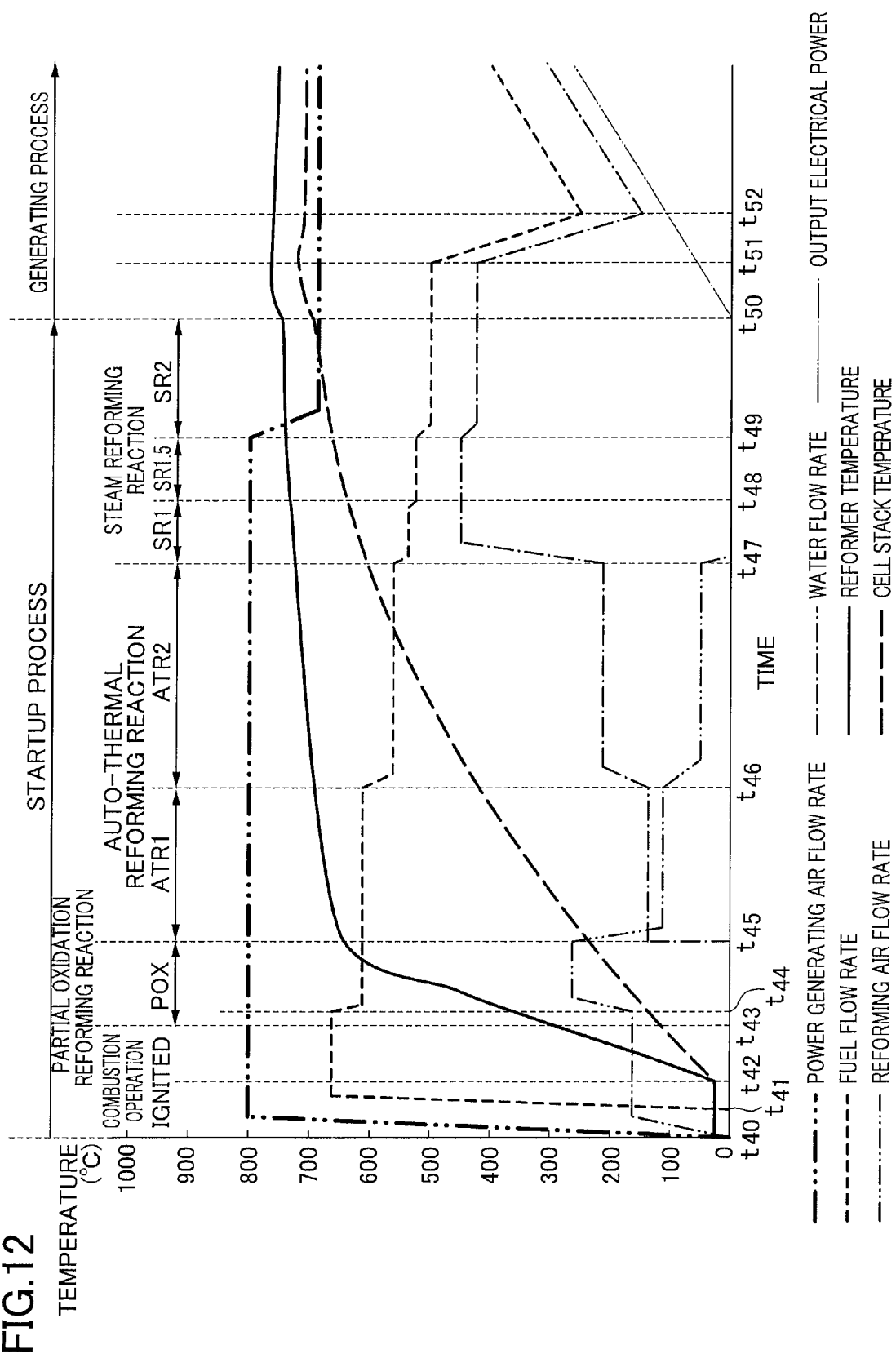
FIG. 12: An explanatory diagram showing excess temperature rise suppression control at startup in a fuel cell device according to a second embodiment of the present invention.

Next, referring to FIGS. 12 and 13, we explain excess temperature rise suppression control of a solid oxide fuel cell (SOFC) device according to a second embodiment.

Under the excess temperature rise suppression control of the present embodiment, when a temperature rise assist state is sensed an SR1.5 process is added between the SR1 process and SR2 process to prevent an excess temperature rise.

Compared to FIG. 7 and FIG. 10, FIG. 12 shows the case of a still faster increase in the reformer temperature and cell stack temperature. Below we explain primarily the points of difference relative to the normal startup operation and processing described in FIGS. 7 and 9.

Compared to FIG. 9, in FIG. 13 an SR1.5 process is added between the SR1 process and SR2 process, in conjunction with which transition temperature conditions differ.

The startup state from time $t_{40}$ to time $t_{47}$ is essentially the same as the startup state from time $t_0$ to time $t_7$ in FIG. 7, hence an explanation thereof is here omitted.

The temperature rise of the reformer 20 is faster than that of the fuel cell stack 14, therefore the temperature of the reformer 20 before time $t_{47}$ exceeds 650° C., which is the temperature condition for transitioning from the ATR2 process to the SR1 process, and reaches 700° C. At time $t_{47}$, when the cell stack temperature reaches the transition temperature condition of 600° C., both transition conditions are met, therefore the control unit 110 causes a transition from the ATR2 process to the SR1 process.

When the reformer temperature further exceeds the transition temperature condition of 650° C. and reaches a predetermined transition condition change temperature (in this example, 700° C.) at the time of transition from the ATR process to the SR1 process, a large amount of heat is accumulated in the fuel cell module 2, and the control unit 110 determines that the reformer 20 is in a temperature rise assist state, with its temperature raised by this heat amount. As a result, the control unit 110 changes the startup process from the SR1 process forward to the process shown in FIG. 13.

Regarding the cell stack temperature, in the present embodiment the condition for transition from the SR1 process to the SR1.5 process (SR1.5 transition condition: 620° C.) is set to be a lower temperature condition than the normal transition condition from the SR1 process to the SR2 process (650° C.) shown in FIG. 9. Therefore at the point where the cell stack temperature has reached 620° C. after transition to the SR1 process (time $t_{48}$), the control unit 110 causes an early transition from the SR1 process to the SR1.5 process. Note that at time $t_{48}$, the reformer temperature is at or above the transition temperature condition of 650° C., and in FIG. 12 has risen in temperature even further than at the start of the SR1 process (time $t_{47}$), and is still over 700° C.

In this SR1.5 process, the control unit 110 reduces the fuel gas supply amount to 2.6 (L/min). This fuel gas supply amount is set to be less than the SR1 process but more than the SR2 process. The amount of exhaust gas is thus reduced, and the rise in reformer temperature is suppressed. In the SR1.5 process, the cell stack temperature rises to catch up with the reformer temperature.

After transitioning to the SR1.5 process, when the cell stack temperature reaches 660° C. (time $t_{49}$), the control unit 110 causes a transition from the SR1.5 process to the SR2 process (the SR2 transition condition). At time $t_{49}$, the reformer temperature is at or above the transition temperature condition of 650° C., and the over-700° C. state shown in FIG. 12 continues.

In the SR2 process, the control unit 110 reduces the fuel gas supply amount to 2.3 (L/min) and reduces the water supply amount to 6.3 (cc/min). The amount of exhaust gas is thus further reduced, and reformer temperature rises are suppressed. In the SR2 process the cell stack temperature rises to catch up with the reformer temperature.

After transitioning to the SR2 process, at the point where the cell stack temperature reaches 700° C. (time $t_{50}$), the control unit 110 causes a transition from the SR2 process to the generating process (the generating process transition condition). At time $t_{50}$, the reformer temperature is at or above the transition temperature condition of 650° C.

Thus under the excess temperature rise suppression control of the present embodiment, if the reformer temperature rise is extremely fast, and the reformer temperature is at or above the transition condition change temperature (in this case 700° C.) at the time of transition to the SR1 process, multiple transitions are carried out, i.e., an early transition is made from the SR1 process to the SR1.5 process in which there is a temperature rise suppression effect; and subsequently there is also a transition to the SR2 process, which has a high temperature rise suppression effect. Thus in the present embodiment sudden changes in temperature distribution and rises in reformer temperature are suppressed by the multistage transition between processes within the SR process, and during the startup process which includes the SR process and the generating process, especially at the time of transition to the generating process and during a predetermined period following transition to the generating process, a situation where the reformer temperature and cell stack temperature are over raised to or above the anomaly determination temperature at which degradation and damage could occur, can be prevented.

Note that in the present embodiment a determination is made of a temperature rise assist state at the time of transition to the SR process, and an SR1.5 intermediate process is provided between SR1 and SR2, but without such limitation it is also acceptable to make a similar temperature rise assist state determination in the POX process or the ATR process, and provide an intermediate process.

Next, referring to FIG. 14, we explain excess temperature rise suppression control in a solid oxide fuel cell (SOFC) device according to a third embodiment.

Under the excess temperature rise suppression control of the present embodiment, when a temperature rise assist state is sensed, a temperature difference reduction control is executed to reduce the temperature difference between the reformer temperature and the cell stack temperature. More specifically, under this temperature difference reduction control a limited generating process is executed in parallel with the startup process.

FIG. 14, as in FIG. 12, shows the case of a fast rise in the reformer temperature and cell stack temperature. Below we explain primarily the points of difference relative to the normal startup operation and processing described in FIGS. 7 and 9.

In the present embodiment, from time $t_{60}$ to time $t_{71}$ the control unit 110 is processing transitions between each process based on the transition conditions for reformer temperature and cell stack temperature.

When the reformer temperature further exceeds the transition temperature condition of 650° C. and reaches an early generating start temperature (in this example, 700° C.) at the time of transition from the ATR process to the SR1 process, a large amount of heat is accumulated in the fuel cell module 2, and the control unit 110 determines that the reformer 20 is in a temperature rise assist state, with its temperature raised by this heat amount.

The control unit 110 thus executes a limited generating process, limited to a fixed value at which generated power is less than the rated value, in parallel to the SR1 process. The amount of power extracted in the limited generating process is set fixed and a temperature difference reduction control is executed in a stable state. Note that the limited generating process may start at any desired point within the SR process (including the SR1.5 process if provided).

In the SR process it is not possible to extract large enough amounts of electrical power to be able to supply full-fledged power to an outside load, but small amounts of electrical power can be extracted. In a limited generating process, the cell stack temperature is raised by the generating reaction and by Joule heating. On the other hand when electrical generation is started, post-reform fuel gas is consumed by the generating reaction, therefore the amount of post-reform fuel gas outflowing from individual fuel cell units 16 and the amount of exhaust gas from the combustion portion heating the reformer 20 are reduced, therefore as a whole the rise in reformer temperature is suppressed. The temperature difference between the reformer temperature and the cell stack temperature is thus reduced. FIG. 14 shows the differences between reformer temperature and cell stack temperature when temperature difference reduction control is not executed (the fine dotted line) and is executed.

Power generated in the limited generating process is used by the pump (e.g., for the water flow rate regulator unit 28, the first heater 46, etc.) in the auxiliary unit 4 on the fuel cell device 1, or electrical resistance, etc. The system can also be constituted to supply electrical power to an external load.

In addition, when conditions for transitioning from the SR2 process to the generating process are met at time $t_{69}$, the control unit 110 transitions to a full fledged generating process in which external power load following is implemented.

Thus in the temperature difference reduction control (excess temperature rise suppression control) of the present embodiment, when the rise in reformer temperature is faster than the rise in cell stack temperature, the rise in the cell stack temperature is speeded up and the rise of the reformer temperature is suppressed by execution of a limited generating process during the SR process. In the present embodiment the difference between the reformer temperature and the cell stack is thus reduced and the rise in reformer temperature is suppressed, and during the startup process which includes the SR process and the generating process, especially at the time of transition to the generating process and during a predetermined period following transition to the generating process, a situation where the reformer temperature and the cell stack temperature are over raised to or above the anomaly determination temperature at which degradation and damage could occur, can be prevented.

Note that in the present embodiment the temperature difference reduction control is executed when the reformer temperature at the time of the SR1 transition is at or above the early generation start temperature (700° C.), but without such limitation, a constitution is also possible in which when the difference between the reformer temperature and cell stack temperature at the time of the SR1 transition is equal to or greater than a predetermined temperature difference, a temperature rise assist state is determined to be present and the temperature difference reduction control is executed.

Next, referring to FIG. 15, we explain excess temperature rise suppression control of a solid oxide fuel cell (SOFC) device according to a fourth embodiment. This embodiment is similar to the first embodiment, but the conditions for transition from the SR2 process to the generating process are further relaxed.

In the present invention when the speed of the reformer temperature rise is faster than the speed of the temperature rise in a normal room temperature state, a temperature rise assist state is determined to be present, and excess temperature rise suppression control is exercised. Under this excess temperature rise suppression control, when a temperature rise assist state is sensed the transition temperature conditions in the operation table shown in FIG. 9 are relaxed to achieve an early transition to the next process.

FIG. 15 is an operation table used in the excess temperature rise suppression control of the present embodiment; compared to FIG. 9, only the transition temperature conditions differ, and the supply amounts of fuel gas etc. in each process have the same settings. Note that in the operation tables from FIG. 15 forward, the parts differing from FIG. 9 are surrounded by squares.

In the startup process, in a state in which compared to normal startup the speed of the reformer temperature rise is faster than the speed of the cell stack temperature rise, the temperature difference between the reformer temperature and the cell stack temperature in the SR1 process is larger than during a normal startup after the sequence of transitions between the combustion operation process, POX1 process, POX2 process, ATR1 process, ATR2 process, and SR1 process.

In the operation table shown in FIG. 9, the normal condition for transitioning from the SR1 process to the SR2 process is a reformer temperature of 650° C. or greater and a cell stack temperature of 650° C. or greater (the normal SR2 transition condition).

As described above, however, if in the SR1 process the difference between the reformer temperature and the cell stack temperature is large, some time is required until the cell stack temperature reaches 650° C. or greater after the reformer temperature first reaches 650° C. or greater, leading to a risk that when the cell stack temperature reaches 650° C. or greater the reformer temperature may, due to an excess temperature rise, reach the anomaly determination temperature of 800° C.

Therefore as in the first embodiment, in the SR1 process when the reformer temperature reaches a first forced transition temperature (in this example 700° C.), notwithstanding that the cell stack temperature has not reached the temperature condition for transitioning to the SR2 process (650° C.), the control unit 110 as determining means determines the presence or occurrence of a temperature rise assist state.

The control unit 110 thus adds to the temperature condition for transitioning from the SR1 process to the SR2 process, so that in addition to the reformer temperature being 650° C. or greater and the cell stack temperature being 650° C. or greater, the reformer temperature can also be 700° C. or greater, regardless of cell stack temperature (the changed SR2 transition condition).

Since the cell stack temperature has not reached 650° C., the normal SR2 transition temperature condition is not satisfied, therefore depending on the normal SR2 transition conditions, the control unit 110 cannot carry out a transition to the SR2 process. However, the reaching of the first forced transition temperature (700° C.) by the reformer results in satisfaction of the changed SR2 transition condition in which overall transition conditions were relaxed, so the control unit 110 is able to effect an early transition from the SR1 process to the SR2 process based on the changed SR2 transition condition.

The fuel gas supply amount and water supply amount are reduced more in the SR2 process than in the SR1 process, so with respect to the suppression of the endothermic steam reforming reaction, this is disadvantageous as a temperature rise suppression effect on the reformer temperature. However the amount of post-reformed fuel gas outflowing from individual fuel cell units 16, and the amount of exhaust gas from combustion portion heating the reformer 20, are reduced by the reduction in the fuel gas supply amount in the SR2 process, therefore as whole the rise in reformer temperature is suppressed.

On the other hand by receiving a gas flow from the reformer 20 in the SR2 process, the cell stack temperature can be raised to gradually catch up with the reformer temperature.

Also, in the operation table shown in FIG. 9, the normal condition for transitioning from the SR2 process to the generating process is a reformer temperature of 650° C. or greater and a cell stack temperature of 700° C. or greater (the normal generating process transition condition).

However in the SR2 process as well, when the difference between the reformer temperature and the cell stack temperature is still large, the reformer temperature has reached 650° C. at the time of the SR2 transition, therefore by waiting until the cell stack temperature reaches 700° C. or greater, there is a risk that the reformer temperature will have reached the anomaly determination temperature of 800° C. when the cell stack temperature reaches 700° C.

Therefore in this case as well, in the SR2 process when the reformer temperature reaches a second forced transition temperature (in this example 720° C.), notwithstanding that the cell stack temperature has not reached the temperature condition for transitioning to the generating process (700° C.), the control unit 110 as determining means determines the presence or occurrence of a temperature rise assist state.

The control unit 110 thus adds to the temperature condition for transitioning from the SR2 process to the generating process, so that in addition to a reformer temperature of 650° C. or greater and a cell stack temperature of 700° C. or greater, the reformer temperature can also be 720° C. or greater, regardless of cell stack temperature (the post-change generating process transition condition). Therefore although the cell stack temperature has not reached 700° C., the reaching of the second forced transition temperature (720° C.) by the reformer results in satisfaction of the relaxed post-change generating process transition conditions, so that control unit 110 is able to effect an early transition from the SR2 process to the generating process. Note that the first and second forced transition temperature conditions are set lower than the anomaly determination temperature.

When there is a transition to the generating process, the cell stack temperature gradually rises to catch up with the reformer temperature due to gas inflow from the reformer 20, and due to the generating reaction and Joule heating in the fuel cell stack 14. The cell stack temperature can thus reach 700° C. or greater. With respect to the reformer temperature, on the other hand, the fuel gas supply amount and water supply amount are reduced in the generating process, therefore following a temporary temperature rise immediately after transitioning to the generating process, temperature rises are suppressed, and an appropriate temperature range is maintained. Also, by making an early transition from the SR2 process to the generating process the reformer temperature has a temperature margin relative to the anomaly determination temperature at the time of transition to the generating process, therefore the reformer temperature can be prevented from reaching the anomaly determination temperature due to the temporary temperature rise immediately following the start of generation.

Thus under the excess temperature rise suppression control of the present embodiment, if the speed of the reformer temperature rise is faster than the speed of the cell stack temperature rise, relaxing the transition temperature conditions causes the reformer temperature to reach a first or second forced transition temperature set higher than the normal transition temperature condition, so that even if the cell stack temperature does not satisfy the transition temperature conditions, an early transition to the next process is accomplished. Thus in the present embodiment a rise in reformer temperature is suppressed, and during the startup process and generating process which include the SR process, especially at the time of transition to the generating process and during a predetermined period following transition to the generating process, excess temperature rises above a predetermined value (the anomaly determination temperature) at which the reformer temperature, cell stack temperature, etc. cause degradation and damage, can be prevented.

Note that in the present embodiment a temperature rise assist state is determined during the SR process and the temperature conditions for transitioning from the SR1 process to the SR2 process are changed along with the temperature conditions for transitioning from the SR2 process to the generating process, but without such limitation a temperature rise assist state may also be determined in the POX process or the ATR process, and the transition temperature conditions changed.

Figure 16:
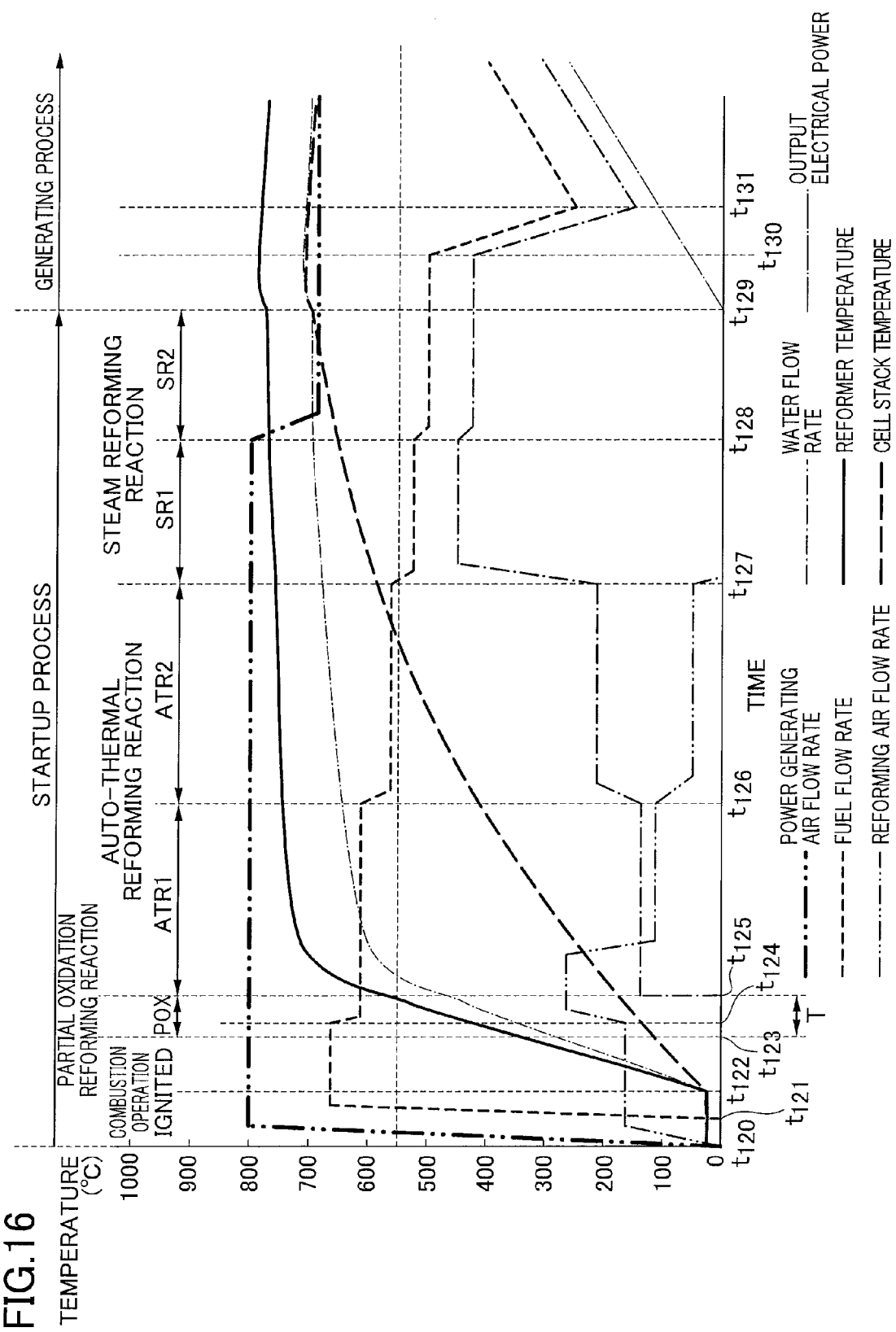
FIG. 16: An explanatory diagram showing excess temperature rise suppression control at startup in a fuel cell device according to a fifth embodiment of the present invention.

Next, referring to FIG. 16, we explain excess temperature rise suppression control of a solid oxide fuel cell (SOFC) device according to a fifth embodiment.

In the embodiment shown in FIG. 15, an early transition to the next process was effected by adding predetermined conditions, even in cases where either the reformer temperature or cell stack temperature transition temperature condition was not satisfied, but in the embodiment shown in FIG. 16, an early transition to the next process is effected even in cases where neither the reformer temperature or the cell stack temperature transition temperature condition was satisfied.

During the startup operation shown in FIG. 16, in the initial stage of the startup, startup begins at time $t_{120}$, supply of fuel gas is started at time $t_{121}$, ignition occurs at time $t_{122}$, and transition to the POX1 process occurs at time $t_{123}$, after which there is a transition to the POX2 process at time $t_{124}$. In FIG. 16, the changes in reformer temperature over time during a normal startup process shown in FIG. 7 are added for comparison as a fine dot and dash line.

In the present embodiment as well, the basic operation table used is the one shown in FIG. 9. Therefore the temperature condition for transitioning from the POX2 process to the ATR1 process is that the reformer temperature be 600° C. or above, and the cell stack temperature be 250° C. or above (the normal ATR1 transition condition).

However if, in the present embodiment, the speed of the reformer temperature rise is faster than normal during the POX process and the reformer temperature reaches a forced transition temperature (in this case 550° C.) within a predetermined limit period T from the start of the POX process, the control unit 110 as determining means determines the presence or occurrence of a temperature rise assist state.

In the present embodiment the forced transition temperature is set lower than the temperature condition for transitioning from the SR2 process to the ATR1 process, but if the reformer temperature has risen to the forced transition temperature within the limit period T from the start of the POX process, it is anticipated that the speed of the reformer temperature rise is faster than normal. Therefore if the reformer temperature reaches the forced transition temperature within the limit period T from the start of the POX process before the normal ATR1 transition condition is satisfied, the control unit 110 determines a temperature rise assist state, in which there is a high risk of an excessive temperature rise.

Accordingly, as shown in FIG. 16, the normal ATR1 transition conditions are not satisfied, but a transition is made from the SR2 process to the ATR1 process at time $t_{125}$, when the limit period T has elapsed after the start of the POX process. As a result, an endothermic steam reforming reaction is executed in addition to the exothermic partial oxidation reforming reaction, so that the speed of the reformer temperature rise is reduced, and the increase in the temperature difference between the reformer temperature and the cell stack temperature is suppressed.

In such an embodiment, an excessive temperature rise can be prevented even if neither the reformer temperature or the cell stack temperature satisfies the transition temperature conditions by determining a temperature rise assist state based on the speed of the reformer temperature rise.

Note that although in this embodiment the temperature rise assist state determination is made based on the speed of the reformer temperature rise during the limit period T, without such limitation a determination of temperature rise assist state can also be made based on a calculated speed of temperature rise, by calculating the temperature rise speed from the rate of change vs. time of the reformer temperature over a short predetermined period.

Also, although in the present embodiment excess temperature rise suppression control is executed based on the speed of the reformer temperature rise in the POX process, without such limitation a similar excess temperature rise suppression control can be executed in the ATR process and SR process as well.

In addition, although in the present embodiment excess temperature rise suppression control is executed based on the speed of reformer temperature rise, without such limitation a similar excess temperature rise suppression control can be executed based on the speed of cell stack temperature rise.

Next, referring to FIGS. 17 through 19, we explain excess temperature rise suppression control of a solid oxide fuel cell (SOFC) device according to a sixth embodiment.

If, when the reformer temperature rise speed is faster than the cell stack temperature rise speed, and at the end of the POX process or the end of the ATR process the reformer temperature has reached a first or second transition condition change temperature (in this example, 650° C. and 700° C., respectively), the excess temperature rise suppression control of the present embodiment changes subsequent transition temperature conditions from those in the normal operation table.

During the startup operation shown in FIG. 17, in the initial stage of the startup, startup begins at time $t_{140}$, supply of fuel gas is started at time $t_{141}$, ignition occurs at time $t_{142}$, transition to the POX1 process occurs at time $t_{143}$, transition to the POX2 process occurs at time $t_{144}$, and subsequently transition to ATR1 occurs at time $t_{145}$. In FIG. 17, the changes in reformer temperature over time during a normal startup process shown in FIG. 7 are added as a thin dot and dash line for comparison.

In the present embodiment as well, the basic operation table used is the one shown in FIG. 9.

However, if in the present embodiment the reformer temperature rise speed is faster than at normal startup, and during the transition from the POX2 process to the ATR1 process the reformer temperature reaches a first transition condition change temperature (650° C.) higher than the ATR1 process transition condition temperature of 600° C. at the point when the cell stack temperature reaches the temperature condition (250° C.) for transitioning to the ATR1 process, the control unit 110 as determining means determines the presence or occurrence of a temperature rise assist state.

When a temperature rise assist state is determined at the end of the POX2 process, the control unit 110 relaxes the cell stack temperature transition conditions from then forward, and operational control is performed using the operation table in FIG. 18. In the table shown in FIG. 18, cell stack temperature transition temperature conditions are relaxed from the ATR1 process forward, and are respectively reduced by 50° C. each. In other words the temperature condition at the time of the ATR process transition is reduced from 400° C. to 350° C., the temperature condition at the time of the SR1 process transition is reduced from 600° C. to 550° C., the temperature condition at the time of the SR2 process transition is reduced from 650° C. to 600° C., and the temperature condition at the time of the generating process transition is reduced from 700° C. to 650° C.

If, in the present embodiment, the reformer temperature rise speed is faster than at normal startup, and during the transition from the ATR2 process to the SR1 process the reformer temperature reaches a second transition condition change temperature (700° C.) higher than the SR1 process transition condition temperature of 650° C. at the point when the cell stack temperature reaches the SR1 transition condition temperature (600° C.), the control unit 110 as determining means determines the presence or occurrence of a temperature rise assist state.

If a temperature rise assist state is determined at the end of the ATR2 process, the control unit 110 relaxes the cell stack temperature transition conditions thereafter, and operational control is performed using the operation table in FIG. 19. In the table shown in FIG. 19, cell stack temperature transition temperature conditions are relaxed from the SR1 process forward, and are respectively reduced by 50° C. each. I.e., the SR2 process transition temperature condition is reduced from 650° C. to 600° C., and the generating process transition temperature condition is reduced from 700° C. to 650° C.

If the reformer temperature reaches a predetermined second transition condition change temperature at the end of the POX process or ATR process in which the range of reformer temperature rise is large (the reformer temperature rise is especially pronounced in the POX process), a large temperature difference will be maintained between the reformer temperature and the cell stack temperature, and the risk of an excessive temperature rise will increase in the ATR process and SR process to be executed.

Therefore in the present embodiment, if the reformer temperature reaches first or second transition condition change temperature at the end of the POX process or ATR process, a determination of a temperature rise assist state is made, and subsequent transition temperature conditions are relaxed, enabling earlier process transitions, so that excessive temperature rises can be prevented by finally transitioning up to the generating process.

Note that in the present embodiment the excess temperature rise suppression control is executed because the reformer temperature reached the first or second transition condition change temperature, but without such limitation the transition temperature condition for reformer temperature can be made to relax when the cell stack temperature reaches a transition condition change temperature.

Figure 22:
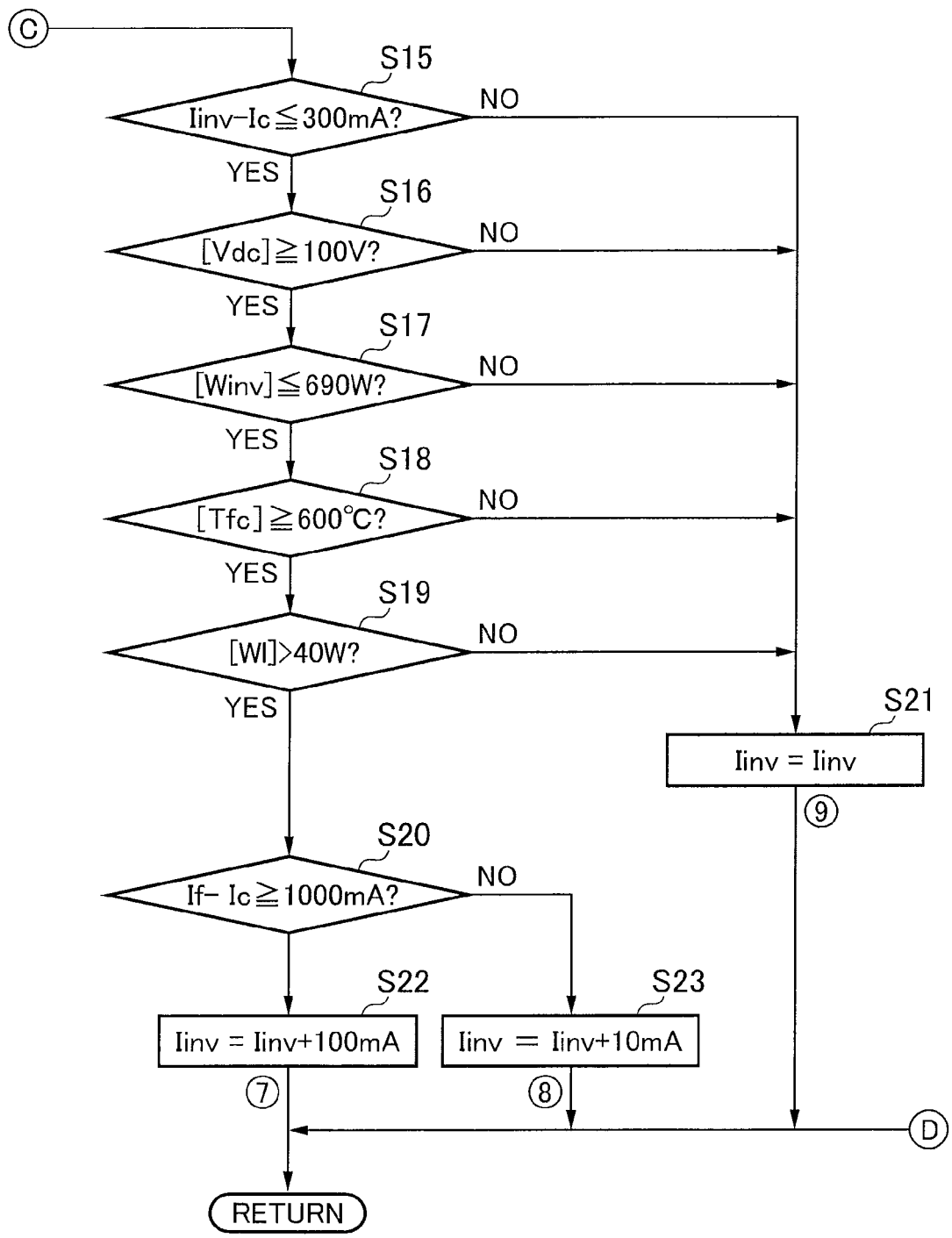
FIG. 22: A flow chart for control executed by a control unit.

Next, referring to FIGS. 20 through 22, we explain excess temperature rise suppression control of a solid oxide fuel cell (SOFC) device according to a seventh embodiment.

If in the present embodiment there is a transition to the generating process in a state whereby the reformer temperature has come closer than normal to the anomaly determination temperature (in this example, 800° C.) due to the effects of the residual heat amount, temperature monitoring control is performed as part of excess temperature rise suppression control. This temperature monitoring control backs up the excess temperature rise suppression control during the startup process in the above embodiments, so that excessive temperature rise is reliably prevented in the generating process.

First we discuss the processing flow in the generating process of fuel cell device 1 of the present embodiment. FIG. 20 is a control table for setting an extractable current value Iinv using the control unit 110. FIGS. 21 and 22 are flowcharts for determining the extractable current value Iinv by applying the control table shown in FIG. 20.

The control unit 110 sets the extractable current value Iinv based on input signals from various sensors and on a demand power monitor signal, and outputs that value to an inverter control unit (not shown).

As shown in FIG. 20, the control unit 110 makes a determination to increase, reduce, or maintain the extractable current value Iinv based on the generating chamber temperature (cell stack temperature) Tfc; the generated voltage Vdc output from the fuel cell module 2; grid power WI, being the power supplied from commercial power sources to facilities such as residences, etc.; interconnect power Winv, being the power output from the inverter 54; the present value of extractable current value Iinv; and the fuel supply current value If.

Note that in the present Specification a temperature which serves as an index of the generating capacity of the fuel cell module 2, such as the generating chamber temperature Tfc, is treated as the "fuel cell module temperature."

The generated voltage Vdc is the output voltage output from the fuel cell module 2.

The grid power WI is the power supplied by commercial power sources to residences and the like, which corresponds to total facility demand power minus power supplied by fuel cells, and is detected based on a power demand monitor signal.

The interconnect power Winv is the power output from the inverter 54. Power actually extracted from the fuel cell module 2 to the inverter 54 is detected by the electrical power state detection sensor 126; power converted from this power is output from the inverter 54. Actual extracted current Ic [A] actually output from the fuel cell module 2 is obtained based on the power detected by the power state detection sensor 126. Therefore the power state detection sensor 126 functions as an extracted current detection means.

The fuel supply current value If is a current value used as the basis for obtaining a fuel gas supply amount, and corresponds to the value of current which can be generated using the fuel gas supply amount (L/min) supplied to the fuel cell module 2. Therefore the fuel supply current value If is set so that it is always less than the extractable current value Iinv.

The control unit 110 determines whether the current state of the fuel cell module 2 corresponds to any of numbers 1 through 9 in FIG. 20, and executes a change or maintains the extractable current Iinv shown in the rightmost column of FIG. 20.

For example, when all the conditions listed in Line 1 in FIG. 20 are simultaneously satisfied, the control unit 110 changes the extractable current Iinv so as to reduce it by 5 [mA], as shown at the right side of Line 1. As noted above, in the present embodiment the control cycle of the control unit 110 is 500 [msec], therefore when the conditions in Line 1 are satisfied, the extractable current value Iinv is reduced by 5 [mA] every 500 [msec]. In this case, the extractable current value Iinv is reduced at a current reduction change rate of 10 [mA/sec].

Similarly, when all the conditions listed in Line 8 of FIG. 20 are simultaneously satisfied, the control unit 110 changes the extractable current Iinv so as to increase it by 10 [mA], as shown at the right side of Line 8. Therefore if the state continues whereby the Line 8 conditions are met, the extractable current value Iinv is raised at a change rate of 20 [mA/sec], which is the first current increase change rate.

If none of the conditions listed in Lines 1 through 8 in FIG. 20 is satisfied, this corresponds to the Line 9 condition, and the value of the extractable current value Iinv is maintained without change.

Next, referring to FIGS. 21 and 22, we explain the determining procedure for the conditions in the control table shown in FIG. 20. Note that reference numerals A through D in FIGS. 21 and 22 indicate the processing transition destination. For example, flow processing transitions from "C" in FIG. 21 to "C" in FIG. 22.

As explained below, even in situations where the extractable current value Iinv must be increased, such as when demand power rises, the control unit 110 increases the extractable current value Iinv only when multiple predetermined increase restriction conditions are not applicable. Furthermore, the increase restriction conditions include multiple current reduction conditions and current maintain conditions, and when these conditions apply, the extractable current value Iinv is reduced or maintained. The multiple current reduction conditions (steps S5, S7, S9, S11, S13 in FIG. 21) apply with priority before the multiple current maintain conditions (steps S15, S16, S17, S18, S19 in FIG. 22).

First, step in FIG. 21 is a step for judging whether an extremely large deviation has been produced between the extractable current value Iinv and the actual extracted current value Ic; here a judgment is made as to whether a deviation between the two of greater than 1000 [mA] has occurred. The case in which a deviation or difference between the extractable current value Iinv and the actual extracted current value Ic of greater than 1000 [mA] occurs for the first time during a short control cycle is considered a situation in which the deviation occurred as the result of the inverter 54 suddenly reducing the actual extracted current value Ic due to a sudden drop in total demand power or some other reason, therefore the system advances to step S2.

In step S2, a judgment is made as to whether the grid power WI is less than 50 [W]. If the grid power WI is less than 50 [W], then when the grid power WI decreases further than this, the probability increases of a "reverse power flow (state in which the grid power WI goes negative)," in which output power from the inverter 54 flows to the commercial power source. Therefore in order to prevent the occurrence of a reverse power flow due to total demand power falling off greatly, a judgment can be made that the inverter 54 has suddenly lowered the actual extracted current value Ic based on the S2 determination and the S1 determination. Note that the reason for setting the value of the grid power WI in S2 at 50 W is to provide a 50 W margin to eliminate even a remote chance of a reverse power flow occurring.

Next, when a YES judgment is made for both S1 and S2, i.e., if a stop reverse power flow control is implemented by the inverter 54 in conjunction with an extremely large drop in power demand, the control unit 110 will, in step S3, suddenly reduce down to the actual extracted current value Ic the extractable current value Iinv by which the inverter control portion is instructed (corresponding to No. 6 in FIG. 20). With the end of the processing in step S3, one iteration of processing in the flowcharts in FIGS. 21 and 22 is completed. The inverter 54 extracts the actual extracted current value Ic in a range not exceeding the extractable current value Iinv, lowering the extractable current value Iinv so that the extractable current value Iinv=the actual extracted current value Ic, such that the inverter 54 is restricted to unilaterally increasing extracted current to more than the present actual extracted current value Ic. In cases such as a sudden drop in total demand power, there is a high probability a sudden recovery (increase) in total demand power will immediately follow; the above is a measure taken so that if the inverter 54 suddenly extracts power to respond to the recovered total demand power when there is a large deviation amount in excess of 1000 [mA], that the inverter 54 can be prevented in advance from mistakenly surpassing total demand power or extractable current value Iinv due to a control overshoot or the like. Stated differently, with a small deviation of 1000 [mA] or less, no control to make the extractable current value Iinv equal to the actual extracted current value Ic is implemented, therefore the inverter 54 is allowed to freely and rapidly extract a power between the actual extracted current value Ic and the higher extractable current value Iinv. This is an additional measure taken, since with small deviations of this type, the problem of excess power extraction and the like due to overshoot does not occur, therefore the recovery of total demand power can be quickly followed.

On the other hand, if it is judged in the step S1 and S2 determinations that this is not a circumstance where a reverse power flow associated with a major drop in total demand power will occur, the system advances to step S4. In step S4, a judgment is made as to whether the extractable current value Iinv is more than 1 [A]. If the extractable current value Iinv is more than 1 [A], the system advances to step S5, and a judgment is made as to whether the generated voltage Vdc is less than 95 [V]. If the generated voltage Vdc is less than 95 [V], the system advances to step S6.

In step S6, the control unit 110 lowers the extractable current value Iinv instructed to the inverter control unit by 10 [mA] (corresponding to No. 4 in FIG. 20). With the end of the processing in step S6, one iteration of processing in the flowcharts in FIGS. 21 and 22 is completed. If the processing in step S6 is continuously executed each time the flow chart shown in FIG. 21 is executed, the extractable current value Iinv is reduced at a current reduction change rate of 20 [mA/sec]. If the generated voltage Vdc is less than 95 [V], voltage drops are conceivable due to degradation and the like of the fuel cell module when power is extracted from the fuel cell module 2 to the inverter 54, therefore current extracted to the inverter 54 is suppressed by reducing the extractable current value Iinv so as to reduce the load on the fuel cell module 2.

On the other hand, if the generated voltage Vdc is greater than 95 [V] in step S5, the system advances to step S7. In step S7, a judgment is made as to whether the interconnect power Winv exceeds 710 [W]. If the interconnect power Winv exceeds 710 [W], the system advances to step S8, and in step S8 the control unit 110 reduces by 5 [mA] the extractable current value Iinv instructed to the inverter control unit (corresponding to No. 5 in FIG. 20). In other words, if the interconnect power Winv exceeds 710 [W], the output power from the fuel cell module 2 exceeds rated power, so the current extracted from the fuel cell module 2 is reduced so as not to exceed rated power. With the end of the step S8 processing, one iteration of processing in the flowcharts in FIGS. 21 and 22 is completed. If the processing in step S8 is continuously executed each time the flow chart shown in FIG. 21 is executed, the extractable current value Iinv is reduced at a current reduction change rate of 10 [mA/sec].

Thus by using the applicable current reduction conditions of the multiple current reduction conditions, the control unit 110 changes the extractable current value Iinv so that the rate of change in the extractable current value Iinv is different.

On the other hand, if the interconnect power Winv is 710 [W] or less in step S7, the system advances to step S9. In step S9, a judgment is made as to whether the generating chamber temperature Tfc exceeds 850[° C.]. If the generating chamber temperature Tfc exceeds 850[° C.], the system advances to step S10; in step S10, the control unit 110 reduces by 5 [mA] the extractable current value Iinv instructed to the inverter control unit (corresponding to No. 2 in FIG. 20). I.e., if the generating chamber temperature Tfc exceeds 850[° C.], the temperature of the fuel cell module 2 exceeds the proper operating temperature, so the extractable current value Iinv is reduced and a decline in temperature awaited. With the end of the step S10 processing, one iteration of processing in the flowcharts in FIGS. 21 and 22 is completed. If the processing in step S10 is continuously executed each time the flow chart shown in FIG. 21 is executed, the extractable current value Iinv is reduced at a current reduction change rate of 10 [mA/sec].

On the other hand, if the generating chamber temperature Tfc is 850[° C.] or below in step S9, the system advances to step S11. In step S11, a judgment is made as to whether the generating chamber temperature Tfc is below 550[° C.]. If the generating chamber temperature Tfc is below 550[° C.], the system advances to step S12; in step S12, the control unit 110 reduces by 5 [mA] the extractable current value Iinv instructed to the inverter control unit (corresponds to No. 3 in FIG. 20). I.e., if the generating chamber temperature Tfc is less than 550[° C.], the temperature of the fuel cell module 2 is below the temperature at which proper electrical generation is possible, so the extractable current value Iinv is reduced. The fuel consumed for electrical generation is thus reduced and directed to heating of individual fuel cell units 16, raising their temperature. With the end of the processing in step S12, one iteration of processing in the flowcharts in FIGS. 21 and 22 is completed. If the processing in step S12 is continuously executed each time the flow chart shown in FIG. 21 is executed, the extractable current value Iinv is reduced at a current reduction change rate of 10 [mA/sec].

On the other hand, if the generating chamber temperature Tfc is 550[° C.] or above in step S11, the system advances to step S13. In step S13, a judgment is made of whether the difference between the extractable current value Iinv and the actual extracted current value Ic exceeds 400 [mA] and whether the extractable current value Iinv exceeds 1 [A]. If the difference between the extractable current value Iinv and the actual extracted current value Ic exceeds 400 [mA], and the extractable current value Iinv exceeds 1 [A], the system advances to step S14, and in step S14 the control unit 110 reduces by 5 [mA] the extractable current value Iinv instructed to the inverter control unit (corresponding to No. 1 in FIG. 20). I.e., if the difference between the extractable current value Iinv and the actual extracted current value Ic exceeds 400 [mA], the actual extracted current value Ic, which is what is actually extracted from the fuel cell module 2, is too small relative to the extractable current value Iinv, which is the extractable current, and fuel is wastefully supplied, so the extractable current value Iinv is reduced and fuel waste suppressed. With the end of the processing in step S14, one iteration of processing in the flowcharts in FIGS. 21 and 22 is completed. If the processing in step S14 is continuously executed each time the flow chart shown in FIG. 21 is executed, the extractable current value Iinv is reduced at a current reduction change rate of 10 [mA/sec].

Thus if even one of the multiple current reduction conditions (steps S5, S7, S9, S11, and S13 in FIG. 21) applies, the extractable current value Iinv is reduced even in circumstances where demand power is rising (steps S6, S8, S10, S12, S14).

Meanwhile, in step S4, when the extractable current value Iinv is 1 [A] or less, and in step S13, when the difference between the extractable current value Iinv and the actual extracted current value Ic is 400 [mA] or less, the system advances to step S15.

In step S15, a judgment is made as to whether the difference between the extractable current value Iinv and the actual extracted current value Ic is 300 [mA] or less; in step S16 a judgment is made as to whether the generated voltage Vdc is 100 [V] or greater; in step S17, a judgment is made as to whether the interconnect power Winv is 690 [W] or less; in step S18 a judgment is made as to whether the generating chamber temperature Tfc is 600[° C.] or more; and in step S19, a judgment is made as to whether the grid power WI exceeds 40 [W]. If these conditions are satisfied, the system advances to step S20; if even one of these conditions is not met (corresponding to No. 9 in FIG. 20), the system advances to step S21. In step S21, the previous value of the extractable current value Iinv is maintained without change, and one iteration of the processing in FIGS. 21 and 22 is completed.

Thus in the fuel cell device 1 of the present embodiment, if certain conditions are not met, even when demand power is rising, the extractable current value Iinv is kept constant (step S21 in FIG. 22). Focusing on the generating chamber temperature Tfc, when the generating chamber temperature Tfc is over the upper limit threshold value of 850[° C.], the extractable current value Iinv is lowered (steps S9, S10 in FIG. 21), and if the generating chamber temperature Tfc is lower than the lower limit threshold value of 600[° C.], the extractable current value Iinv is maintained (steps S18, S21 in FIG. 22). If the generating chamber temperature Tfc is even lower, below 550[° C.], the extractable current value Iinv is lowered (steps S11, S12 in FIG. 21).

Meanwhile, in the processing done in step S20 and beyond, the extractable current value Iinv is raised. The control unit 110 increases the extractable current value Iinv (steps S22, S23 in FIG. 22) only when none of the multiple current maintenance conditions (steps S15, S16, S17, S18, S19 in FIG. 22) applies.

In other words, when the difference between the extractable current value Iinv and the actual extracted current value Ic exceeds 300 [mA] (step S15), the extractable current value Iinv should not be raised, since the difference between the extractable current value Iinv and the actual extracted current value Ic is relatively large. Also, if the generated voltage Vdc is less than 100 [V] (step S16), the current extractable from the fuel cell module 2 should not be increased, and the extractable current value Iinv should be increased. Furthermore, when the interconnect power Winv exceeds 690 [W] (Step S17), the power output from the fuel cell module 2 has essentially already reached rated output power, so the current extractable from the fuel cell module 2 should not be increased.

In addition, if the generating chamber temperature Tfc is less than 600[° C.] (step S18), the temperature of the fuel cell module 2 has not reached a temperature at which electricity can be sufficiently generated, therefore the extractable current value Iinv is raised, the current extractable from the fuel cell module 2 is increased, and no load should be placed on individual fuel cell units 16. If the grid power WI is less than 40 [W] (step S19), "reverse power flow" is prone to occur, therefore the current extractable from the fuel cell module 2 should not be increased.

If all the conditions in steps S15 through S19 are satisfied, the system advances to step S20. In step S20 a judgment is made as to whether the difference between the fuel supply current value If and the actual extracted current value Ic is 1000 [mA] or greater. A fuel gas supply amount corresponding to the fuel supply current value If is obtained and supplied to the fuel cell module 2 to implement a generating operation. In other words this value is a conversion of the value for current which can be generated by the fuel cell module 2 using that fuel. For example, if a fuel gas supply amount [L/min] corresponding to a fuel supply current value If=5 [A] is supplied, the fuel cell module 2 is potentially capable of safely and stably outputting 5 [A]. Therefore if the difference between the fuel supply current value If and the actual extracted current value Ic is 1000 [mA], this means that an amount of fuel capable of outputting 1 [A] more current than the actually generated extracted current value Ic is being supplied to the fuel cell module 2.

If, in step S20, the difference between the fuel supply current value If and the actual extracted current value Ic is 1000 [mA] or greater, the system advances to step S22; if less than 1000 [mA], the system advances to step S23. In step S22, because a large amount of extra fuel is being supplied to the fuel cell module 2, the control unit 110 increases by 100 [mA] the value of the extractable current value Iinv instructed to the inverter control unit (corresponding to No. 7 in FIG. 20), rapidly raising the extractable current value Iinv. With the end of the processing in step S22, one iteration of processing in the flowcharts in FIGS. 21 and 22 is completed. If the processing in step S22 is continuously executed each time the flow chart shown in FIG. 22 is executed, the extractable current value Iinv is increased at a second current increase change rate of 200 [mA/sec].

In step S22, meanwhile, although the extractable current value Iinv is being raised, it is not the case that a large amount of extra fuel is being supplied to the fuel cell module 2, therefore the control unit 110 increases the extractable current value Iinv instructed to the inverter control unit by 10 [mA] (corresponding to No. 8 in FIG. 20), gradually raising the extractable current value Iinv. With the end of the processing in step S23, one iteration of processing in the flowcharts in FIGS. 21 and 22 is completed. If the processing in step S23 is continuously executed each time the flow chart shown in FIG. 22 is executed, the extractable current value Iinv is increased at a first current increase change rate of 20 [mA/sec].

In such an embodiment, the control unit 110 controls the extractable current value Iinv in the generating process so that the generating chamber temperature Tfc does not exceed 850° C. The cell stack temperature Tfc and the reformer temperature are correlated, with the relationship that if the cell stack temperature Tfc is 850° C. in the generating process, the reformer temperature is 800° C. Therefore by controlling so that the cell stack temperature Tfc does not exceed 850° C., the reformer temperature can be made not to exceed 800° C., which is the anomaly determination temperature.

Thus in the present embodiment, by temperature monitor control even after transition to the generating process, a back up is performed so the reformer temperature does not reach the anomaly determination temperature. Therefore even when excess temperature rise suppression control does not sufficiently suppress temperature rises before transitioning to the generating process, degradation and damage to the reformer 20 and the like can be reliably prevented.

The following variations may also be made to the embodiments above.

In the embodiments above, the control unit 110 as determining means is determining whether the reformer 20 and the fuel cell stack 14 are in an excessive temperature rise state (temperature rise assist state) using the amount of heat stored in the fuel cell module 2, based on the reformer temperature and the cell stack temperature, but without such limitation the determination can also be performed by other methods.

For example, in each process a temperature rise assist state can be determined according to the difference between the reformer temperature and the cell stack temperature; it can also be determined according to other temperatures including the reformer temperature, the cell stack temperature, and the temperature of the heat storage material 7, as well as temperature change rate or speed of temperature change; it can be determined according to an estimated heat amount, by estimating the heat amount remaining at startup from the temperature rise in the reformer or cell stack relative to fuel gas supply amount; or it can be determined according to the operating state before restart. The risk of excessive temperature rises caused by residual heat amounts can thus be determined by various methods, but in the embodiments above a simple method of determining is adopted, based on reformer temperature and cell stack temperature measurement values in each process.

Note that as shown by the change over time in the stopping operation in FIG. 8, the reformer temperature, the generating chamber temperature, and the combustion portion temperature drop by approximately the same temperature, and residual heat appears to remain not in a localized, but essentially a uniform manner throughout the whole fuel cell module 2. Therefore not only the amount of residual heat affecting the reformer temperature, but also the amount of residual heat affecting the cell stack temperature can be estimated using only the reformer temperature measurement. As a result, in the above embodiment shown in FIG. 16 the control unit 110 as determining means can determine a temperature rise assist state based on a measurement value for the reformer temperature alone.

Also, in the above embodiment the control unit 110 as determining means determines a temperature rise assist state during the SR process or at the time of transition to the SR1 process, for example, but that determination timing may be freely set. The timing of the determination is also arbitrary when determining based on the aforementioned temperature difference, temperature, temperature change rate or temperature change speed, or estimated heat amount.

The embodiment concerned the case in which the reformer temperature rises faster than the cell stack temperature, but without such limitation, there are cases, depending on placement relative to the heat storage material 7, etc., in which cell stack temperature rises faster than the reformer temperature; in such cases by adopting a configuration in the above embodiment which swaps the reformer temperature and cell stack temperature, excessive cell stack temperature rises can be prevented using the same technical idea.

What is claimed is:

1. A solid oxide fuel cell system, comprising:
a cell stack including a stack of multiple fuel cell units disposed in a power generation chamber;
a reformer configured to reform fuel gas and supply the reformed fuel gas to the fuel cell units;
a combustion portion configured to heat the reformer and the cell stack with exhaust gas resulting from combustion of surplus fuel gas or the reformed fuel gas passed through the fuel cell units;
a first temperature detector configured to detect a temperature of the power generating chamber representative of a temperature of the cell stack;
a second temperature detector configured to detect a temperature of the reformer;
a module housing chamber for housing the cell stack and the reformer;
a heat storage means disposed around the module housing chamber;
a determining means for determining whether a temperature rise assist state occurs in which a temperature rise in the reformer and/or cell stack is assisted by the heat amount stored by the heat storage means during startup of the fuel cell system; and
a controller programmed to start up the fuel cell system;
wherein the controller is programmed so that in the fuel cell system startup process, supply flow rates of fuel gas, oxidant gas, and steam supplied to the reformer are controlled based on the cell stack temperature and the reformer temperature, and after a fuel gas reformer reaction process including a plurality of processes performed by reformer, a transition is made from a steam reforming reaction process (SR process) in the fuel gas reformer reaction process to a generating process, and when the cell stack temperature and the reformer temperature satisfy transition conditions set to each of the plurality of processes in the fuel gas reformer reaction process, a transition is made to a next process; and
wherein if the determining means determines an occurrence of a state where one of the temperatures of the reformer and the cell stack reaches a predetermined temperature which is higher than its transition condition temperature, while the other does not reach its transition condition temperature or when the two temperatures reach their transition condition temperature, the controller performs an excess temperature rise suppression control to prevent the reformer temperature from rising to or above a predetermined value, at least at the time of transition to the generating process.

2. The solid oxide fuel cell system of claim 1, wherein when the determining means determines an occurrence of a temperature rise assist state, the excess temperature rise suppression control is started during the startup process before the transition to the generating process.

3. The solid oxide fuel cell system of claim 2, wherein the SR process has an SR1 process and an SR2 process, in which the fuel gas is supplied at a flow rate lower than one at which the fuel gas is supplied in the SR1 process;
wherein the controller switches from the SR1 process to the SR2 process upon satisfaction of SR2 transition conditions, which are conditions for transitioning from the SR1 process to the SR2 process, and for which reformer temperature and cell stack temperature are respectively set; and
when the determining means determines an occurrence of the temperature rise assist state, the controller causes a transition to the SR2 process even if the SR2 transition conditions are not yet satisfied.

4. The solid oxide fuel cell system of claim 3, wherein in the SR1 process, if the reformer temperature satisfies the SR2 transition condition and is equal to or greater than a predetermined forced transition temperature, the controller causes a transition to the SR2 process even if the cell stack temperature is not satisfying the SR2 transition condition.

5. The solid oxide fuel cell system of claim 2, wherein the SR process has an SR1 process and an SR2 process, in which the fuel gas is supplied at a flow rate lower than one at which the fuel gas is supplied in the SR1 process;
wherein the controller switches from the SR1 process to the SR2 process upon satisfaction of SR2 transition conditions, which are conditions for transitioning from the SR1 process to the SR2 process, and for which reformer temperature and cell stack temperature are respectively set; and
when the determining means determines an occurrence of the temperature rise assist state, the controller, before switching from the SR1 process to the SR2 process, executes an SR1.5 process in which the amount of fuel gas is supplied at a flow rate an lower than one at which the fuel gas is supplied in the SR1 process and more than one at which the fuel gas is supplied in the SR2 process.

6. The solid oxide fuel cell system of claim 5, wherein the transition conditions for switching from the SR1 process to the SR1.5 process include a lower temperature condition than that included in the transition conditions for switching to the SR2 transition process.

7. The solid oxide fuel cell system of claim 2, wherein when the determining means determines an occurrence of the temperature rise assist state, the controller executes the temperature rise suppression control in which a temperature difference reduction control is performed for reducing the temperature difference between the reformer temperature and the cell stack temperature.

8. The solid oxide fuel cell system of claim 7, wherein when the determining means determines an occurrence of the temperature rise assist state, during the SR process, under the temperature difference reduction control, the control means extracts electrical power below rated power before transitioning to the generating process.

9. The solid oxide fuel cell system of claim 8, wherein the amount of power extracted is held constant before transitioning to the generating process.

10. The solid oxide fuel cell system of claim 8, wherein power extracted before transitioning to the generating process is supplied to auxiliary devices of the solid oxide fuel cell system.

11. The solid oxide fuel cell system of claim 2, wherein if at a time of transition from one process to a next process, the determining means determines an occurrence of the temperature rise assist state when the reformer temperature is equal to or greater than a first predetermined temperature, the controller, based on this determination, causes a transition to the next process even if the cell stack temperature does not satisfy a transition condition for transitioning to the next process.

12. The solid oxide fuel cell system of claim 11, wherein the first predetermined temperature is set to a temperature higher than a transition condition temperature of the reformer for transitioning to the next process.

13. The solid oxide fuel cell system of claim 12, wherein if, in the SR process, the determining means determines an occurrence of the temperature rise assist state when the reformer temperature is equal to or greater than the first predetermined temperature, the controller, based on this determination, causes a transition to the generating process even if the cell stack temperature does not satisfy the transition condition for transitioning to the next process and the first predetermined temperature is set to be higher than a transition condition temperature of the reformer for transitioning to the generating process, and lower than a second predetermined temperature, which is a reformer anomaly determination temperature.

14. The solid oxide fuel cell system of claim 11, wherein after transitioning to the generating process, the controller executes a temperature monitoring control to regulate the operation of the fuel cell system so that the reformer temperature does not exceed a second predetermined temperature, which is a reformer anomaly determination temperature.

15. The solid oxide fuel cell system of claim 11, wherein the fuel gas reformer reaction process includes a partial oxidation reforming reaction process (POX process) and an auto thermal reforming reaction process (ATR process) wherein the determining means determines whether a temperature rise assist state occurs by using the temperature of the reformer in the POX process or ATR process, and if an occurrence of a temperature rise assist state is determined, transition conditions in that process and subsequent processes are relaxed.

\* \* \* \* \*